(12) United States Patent
Tsubone et al.

(10) Patent No.: US 7,669,647 B2
(45) Date of Patent: Mar. 2, 2010

(54) AIR CONDITIONING APPARATUS

(75) Inventors: Kenji Tsubone, Susono (JP); Yasukazu Aikawa, Nagoya (JP); Yasutane Hijikata, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 889 days.

(21) Appl. No.: 10/521,017

(22) PCT Filed: Jul. 1, 2003

(86) PCT No.: PCT/JP03/08343

§ 371 (c)(1),
(2), (4) Date: Aug. 8, 2005

(87) PCT Pub. No.: WO2004/007224

PCT Pub. Date: Jan. 22, 2004

(65) Prior Publication Data

US 2006/0032623 A1     Feb. 16, 2006

(30) Foreign Application Priority Data

Jul. 16, 2002     (JP)     ............... 2002-207469

(51) Int. Cl.
*B60H 1/00*     (2006.01)
*F25B 29/00*     (2006.01)

(52) U.S. Cl. ............ 165/202; 165/10; 165/42; 165/43; 165/236; 165/240; 62/185; 62/201; 62/244; 62/434; 62/435; 237/12.3 R; 237/12.3 A; 237/12.3 B; 237/2 A; 237/2 B; 123/142.5 R

(58) Field of Classification Search ............ 165/10, 165/41, 42, 43, 236, 202, 240; 62/434, 435, 62/244, 185, 201; 237/12.3 R, 12.3 A, 12.3 B, 237/2 A, 2 B; 123/142.5 R
See application file for complete search history.

(56) References Cited

U.S. PATENT DOCUMENTS 4,240,077 A * 12/1980 Hughes et al. ............. 165/253
5,511,384 A    4/1996 Likitcheva (Continued)

FOREIGN PATENT DOCUMENTS

EP     1 533 154 A1     5/2005

(Continued)

OTHER PUBLICATIONS

International Search eport dated Oct. 14, 2003 for International Application No. PCT/JP03/08343.

(Continued)

*Primary Examiner*—John K Ford
(74) *Attorney, Agent, or Firm*—Finnegan, Henderson, Farabow, Garrett & Dunner, LLP

(57) ABSTRACT

An air conditioning system for cooling or heating an air, and for feeding the heated or cooled air to predetermined portions is characterized by comprising: a first circulating circuit for circulating a first heating medium; a second circulating circuit for circulating a second heating medium; a control unit for controlling the heat for executing heat exchange between the first heating medium and the second heating medium to flow through either the heat exchanger or the first heat storing device. Moreover, an air temperature is controlled by heat of the second heating medium.

18 Claims, 12 Drawing Sheets

U.S. PATENT DOCUMENTS

| | | | |
|---|---|---|---|
| 5,553,662 A * | 9/1996 | Longardner et al. | 165/202 |
| 5,735,133 A * | 4/1998 | Voss et al. | 62/201 |
| 6,059,016 A * | 5/2000 | Rafalovich et al. | 165/41 |
| 6,662,864 B2 * | 12/2003 | Burk et al. | 165/202 |
| 2001/0020529 A1 | 9/2001 | Karl | |

FOREIGN PATENT DOCUMENTS

| | | |
|---|---|---|
| JP | 62-261865 | 11/1987 |
| JP | 02-220923 | 9/1990 |
| JP | 02223768 A * | 9/1990 |
| JP | 06-156062 | 6/1994 |
| JP | 06-211036 | 8/1994 |
| JP | 6 100393 | 12/1994 |
| JP | 08-049934 | 2/1996 |
| JP | 8-61797 | 3/1996 |
| JP | 11173710 A * | 7/1999 |
| JP | 2000-094953 | 4/2000 |
| JP | 2000-142078 | 5/2000 |
| JP | 2002-036903 | 2/2002 |
| JP | 2003-4321 | 1/2003 |

OTHER PUBLICATIONS

Japanese Office Action dated Oct. 10, 2006.
Supplemental European Search Report dated Apr. 3, 2006.
Korean Office Action dated Apr. 27, 2006.
Notice of Reasons for Rejection, Ref. No. 27490000, Mailing Date Oct. 10, 2006.
Translation of Office Action issued on Korean Patent Application No. 2005-7000793.
Patented claims of Japanese Patent No. 3953377 (JPA2002-207469).
Claims in Korea as of Jul. 24, 2006.

* cited by examiner

LOW ←——→ HIGH

LOW ←——→ HIGH

AIR CONDITIONING APPARATUS

TECHNICAL FIELD

This invention relates to an air conditioning system for executing a heat exchange among a plurality of heating mediums, thereby controlling air temperature on the basis of the exchanged heat.

BACKGROUND ART

An air conditioning system for a vehicle is generally constructed to regulate a room temperature by a refrigeration cycle for circulating a refrigerant. The air conditioning system of this kind is disclosed in Japanese Patent Laid-open No. 2000-142078. According to an air conditioning system for a vehicle disclosed in the Laid-open, a compressor, a condenser, a receiver, an expansion valve, an evaporator and so on are arranged in a circulating circuit of the refrigerant. In a casing of the air conditioning system, a blower fan and an evaporator are arranged. Moreover, an air inlet and an air outlet are formed on the casing.

Here will be explained an operation example according to the aforementioned air conditioning system. First of all, when the blower fan is driven, air is inhaled from the air inlet into the casing. On the other hand, when the compressor is driven by an engine power, the refrigerant is compressed by the compressor and made into a high-pressure refrigerant. The compressed and high-pressured refrigerant is then condensed by the condenser and passes through the receiver. The refrigerant is consequently made into a high-temperature and high-pressure liquid refrigerant. This liquid refrigerant is expanded by the expansion valve, and conveyed to the evaporator in the form of a low-temperature and low-pressure liquid refrigerant. In the evaporator, heat in the air is transferred to the refrigerant due to the temperature difference between the air in the casing and the refrigerant, thereby evaporating the liquid refrigerant. The low-temperatured (cooled) air is then fed from the discharging port to the vehicular room. The refrigerant passed through the evaporator flows into the compressor again. Thus, the temperature is regulated in the vehicular room.

"Flow rate of refrigerant" is any one of the conditions which affect the heat transferring capacity of the refrigerant in the circuit. According to the air conditioning system disclosed in the aforementioned Laid-open, since the compressor is driven to transport the refrigerant, the air conditioning function thereof is easily affected by the operating condition of the compressor. This makes it probable that necessary air conditioning function cannot be obtained.

DISCLOSURE OF THE INVENTION

This invention has been made under the aforementioned background, and its object is to provide an air conditioning system in which an air conditioning function is less affected by an operating condition of a compressor for circulating a first heating medium in a first circuit.

More specifically, an object of the invention is to provide an air conditioning system capable of improving fuel consumption by mitigating an impact on an engine load due to an air conditioning demand, in case it is mounted on a vehicle.

In order to achieve the aforementioned object, according to the air conditioning system of the invention, a first circuit for circulating a first heating medium and a second circuit for circulating a second heating medium are arranged separately from each other. Heat exchange between the first and second heating mediums is carried out in a first heat exchanger, and heat exchange between the second heat medium and air is carried out in a second heat exchanger.

The first heating medium is heated or cooled by using a power unit such as an engine, motor and the like, and does not exchange heat with air. Therefore, the first heating medium can be heated or cooled independently from the air conditioning demand. This mitigates direct impact on the load of the power unit due to the air conditioning demand.

According to the invention, moreover, a third heat exchanger, which is different from the first heat exchanger in the heat exchange characteristics, is arranged in the circuit which the first heating medium flows through. Therefore, it is possible to flow the second heating medium through the first heat exchanger or the third heat exchanger selectively, so as to execute heat exchange with the first heating medium. This selection of flow passage is made by operating a selector by a controller. More specifically, in case the air conditioning demand is high, the second heating medium is flown to the heat exchanger having better heat exchange performance than other.

Therefore, the performance of cooling or heating the second heating medium can be changed so that the air conditioning can be executed on demand.

In the first heat exchanger, the flow passage which the first heating medium flows through, and the flow passage which the second heating medium flows through, are formed adjacent to and in parallel with each other, and the flowing directions of each heating medium can be made opposite to each other. With this construction, heat transfer efficiency between the heating mediums can be improved.

The third heat exchanger can be constructed of a heat storing device having a heat storage material therein which is heated or cooled by the first heating medium. In this case, heat capacity of the third heat exchanger is larger than that of the first heat exchanger. Therefore, the second heating medium is flown to the first heat exchanger to execute cooling in response to the rapid cooling demand, and the second heating medium is flown to the third heat exchanger to execute cooling in response to the normal cooling demand, in order to use the stored heat effectively.

According to the invention, furthermore, it is possible to arrange a second heat storing device, which is heated by receiving heat from the first heating medium, and stores the heat therein. For example, as the first heating medium, it is possible to adopt a fluid such that temperature thereof is lowered by pressurizing compression and subsequent adiabatic expansion. In this case, since the amount of heat of the first heating medium is increased due to the pressurizing compression, the heat is not discharged to the outside but recovered by the second heat storing device.

In this invention, the first heat storing device can store heat for cooling, whereas the second heat storing device can store heat for heating. Therefore, it is possible to arrange a control unit for driving a heat source mechanism for cooling or heating the first heating medium, on the basis of the fact that the amount of heat stored in one or both of the heat storing devices is lowered.

As has been described above, the first circuit serves as a circuit for generating heat for air conditioning, and the second circuit serves as a circuit for cooling or heating air. According to the invention, therefore, it is possible to arrange a control unit for operating the first circuit on the basis of temperature of the first heat storing device, and for operating the second circuit on the basis of temperature of air.

In this case, a control of output of a pump for flowing the second heating medium can be made on the basis of the deviation between the air temperature in the outlet side of the second heat exchanger and the target temperature.

In the heat storing device according to the invention, a number of fins are integrated with a pipe which the heating medium flows through, and the pipe and fins are embedded in the heat storage material.

The second heat storing device is heated by the first heating medium and raises its temperature. According to the invention, it is possible to arrange a third circuit for circulating a third heating medium between the second heat storing device and a fourth heat exchanger for transferring heat stored in the second heat storing device.

For heating or cooling the first heating medium of the invention, it is possible to use a mechanism including a compressor for compressing the first heating medium, a heat radiator for radiating heat from the compressed and high-temperatured first heating medium, and a expander for adiabatically expanding the first heating medium. The compressor, the heat radiator and the expander can be connected in series with the first heat exchanger and the first heat storing device. The second heat storing device is preferably connected right behind a discharging port of the compressor. Thus, the heat of the first heating medium is more recovered by the second heat storing device. As a result, a load on the heat radiator is reduced so that the heat radiator can be downsized. In addition, in case of compulsory cooling, energy consumed by a blowing fan can be saved.

Since each heat storing device is adopted to store heat energy for cooling or heating, permission/non-permission of operation of the compressor can be determined on the basis of their temperature. In this case, a hysteresis is set to the permissible temperature and to the non-permissible temperature.

The first heating medium is compressed to raise its temperature, and is adiabatically expanded to lower it temperature. The second heat storing device stores heat of the high-temperatured first heating medium. The first heat storing device is cooled by the adiabatically-expanded and low-temperatured first heating medium, and stores energy for cooling. Therefore, in case the heat storage capacity of the first heat storing device has been saturated, the compressor is not permitted to operate even if the heat storage capacity of the second heat storing device has not been saturated. According to the invention, it is possible to arrange a thawing operation device for heating the first heat storing device temporarily.

The duration of the thawing operation can be set on the basis of the road condition or the running status of the vehicle mounting the air conditioning system thereon.

A prime mover for running can be utilized for driving the compressor. In this case, if the prime mover is compulsorily driven by an running inertia force, it is possible to select a pre-heat storing mode, in which the running inertia force can be utilized for driving the compressor to store heat.

The heat stored in the second heat storing device of the invention can be utilized for various kinds of applications. In order to regulate the air temperature, for example, the heat may be used for airmix for transferring heat to the air once cooled by the second heat exchanger. On the other hand, the heat may be used for heating an internal combustion engine and oil, or for keeping temperature thereof. In case the heat is used for warming up the internal combustion engine or keeping temperature thereof, the heat is provided from the second heat storing device to the internal combustion engine, while the internal combustion engine is kept halted.

BEST MODE FOR CARRYING OUT THE INVENTION

Figure 1:
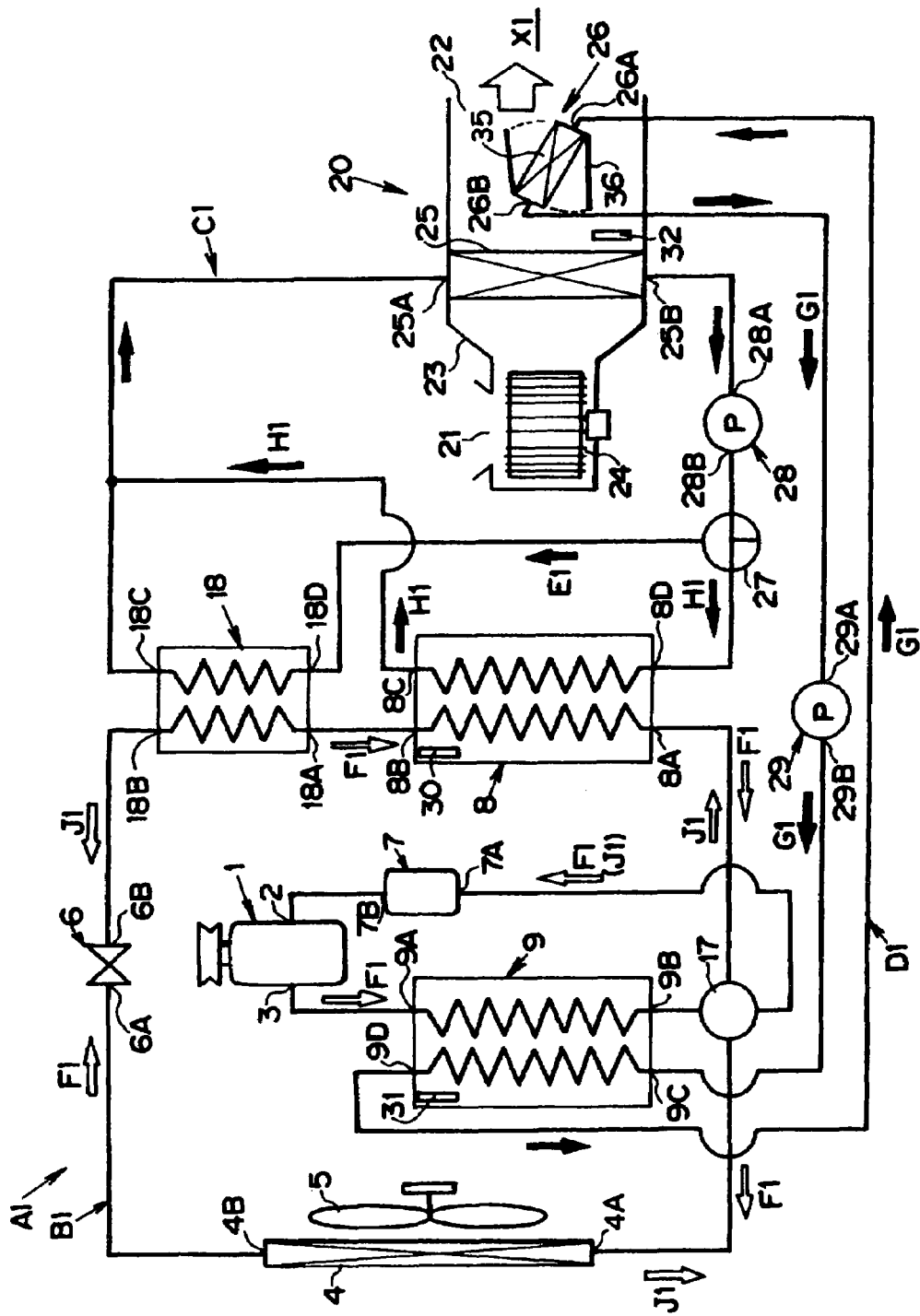
FIG. 1 is a conceptional diagram showing one example of an air conditioning system of the invention.

This invention will be described with reference to the accompanying drawings. FIG. 1 is a conceptional diagram showing a construction of an air conditioning system A1 for a vehicle. The air conditioning system A1 has a first circuit B1, a second circuit C1 and a third circuit D1. Each circulation circuit is, specifically, a flow passage for a fluid having a piping. A refrigerant (e.g., chlorofluorocarbon or refrigerant gas containing no chlorine) flows through the first circuit B1, whereas a brine (e.g., water or saltwater) flows through the second circuit C1 and the third circuit D1.

A construction of the first circuit B1 will be described first. A compressor 1 is arranged in the first circuit B1, which has a suction port 2 and a discharging port 3. The compressor 1 is driven by an (later-described) engine or an (later-described) electric motor. On the other hand, an outdoor heat exchanger 4 is arranged in the first circuit B1. This outdoor heat exchanger 4 is exemplified by a condenser mounted in front of an engine room. The outdoor heat exchanger 4 has a first flow port 4A and a second flow port 4B.

A fan 5 for the outdoor heat exchanger 4 is provided. This fan 5 is driven by the engine or the electric motor. A pressure reducing unit 6 and an accumulator 7 is arranged in the first circuit B1. The pressure reducing unit 6 adiabatically expands the compressed refrigerant, and an expansion valve is adopted as one example. The pressure reducing unit 6 has a first flow port 6A and a second flow port 6B. The first flow port 6A is communicated with the second flow port 4B of the outdoor heat exchanger 4. Moreover, the accumulator 7 has an inlet 7A and an outlet 7B.

On the other hand, there is provided a first heat storing device 8 which constitutes a part of the first circuit B1 and a part of the second circuit C1, and a second heat storing device 9 which constitutes a part of the first circuit B1 and a part of the third circuit D1. A construction example of the first heat storing device 8 and the second heat storing device 9 is comprehensively shown in FIG. 2.

The first heat storing device 8 has a casing 10, and is provided with pipes 11 and 12 passing through inside of the casing 10. The pipe 11 constitutes a part of the first circuit B1, and the pipe 12 constitutes a part of the second circuit C1. The pipes 11 and 12 are bundled or closely contacted with each other, and arranged in the casing 10. Therefore, the flow passages for each refrigerant are adjacent to and in parallel with each other.

The pipe 11 has a first flow port 8A and a second flow port 8B serving as inlet and outlet ports of the casing 10. On the other hand, the pipe 12 has a first flow port 8C and a second flow port 8D serving as inlet and outlet ports to the casing 10. These pipes 11 and 12 are made of metal excellent in heat conductivity, e.g., aluminum, copper or the like.

There are formed plate-like radiation fins 13 on an outer surface of the pipes 11 and 12. A heat storage material 14 is accommodated in the casing 10. For example, water or the like may be used as the heat storage material 14. The heat storage material 14 is contacted with the pipes 11 and 12, and each radiation fins 13. An outer surface of the casing 10 is covered with a heat insulation material 15.

Since the construction of the second heat storing device 9 is almost similar to that of the first heat storing device 8, the similar part will be described with allotting common reference numerals. The second heat storing device 9 has pipes 11 and 16 passing through inside of the casing 10. The pipe 11 constitutes a part of the first circuit B1, and the pipe 16 constitutes a part of the third circuit D1. The pipe 16 is made of metal excellent in heat conductivity, e.g., aluminum, copper or the like, and has an inlet port 9A and an outlet port 9B serving as inlet and outlet ports to the casing 10. The inlet port 9A of the second heat storing device 9 is communicated with the discharging port 3 of the compressor 1. Moreover, the pipe 11 has an inlet 9C and an outlet 9D serving as inlet and outlet ports to the casing 10.

A four-way valve 17 is arranged in the first circuit B1. The four-way valve 17 selectively communicates or shuts off a route between the first flow port 8A of the first heat storing device 8 or the first flow port 4A of the outdoor heat exchanger 4, and the inlet 7A of the accumulator 7 or the second flow port 9B of the second heat storing device 9.

Figure 3:
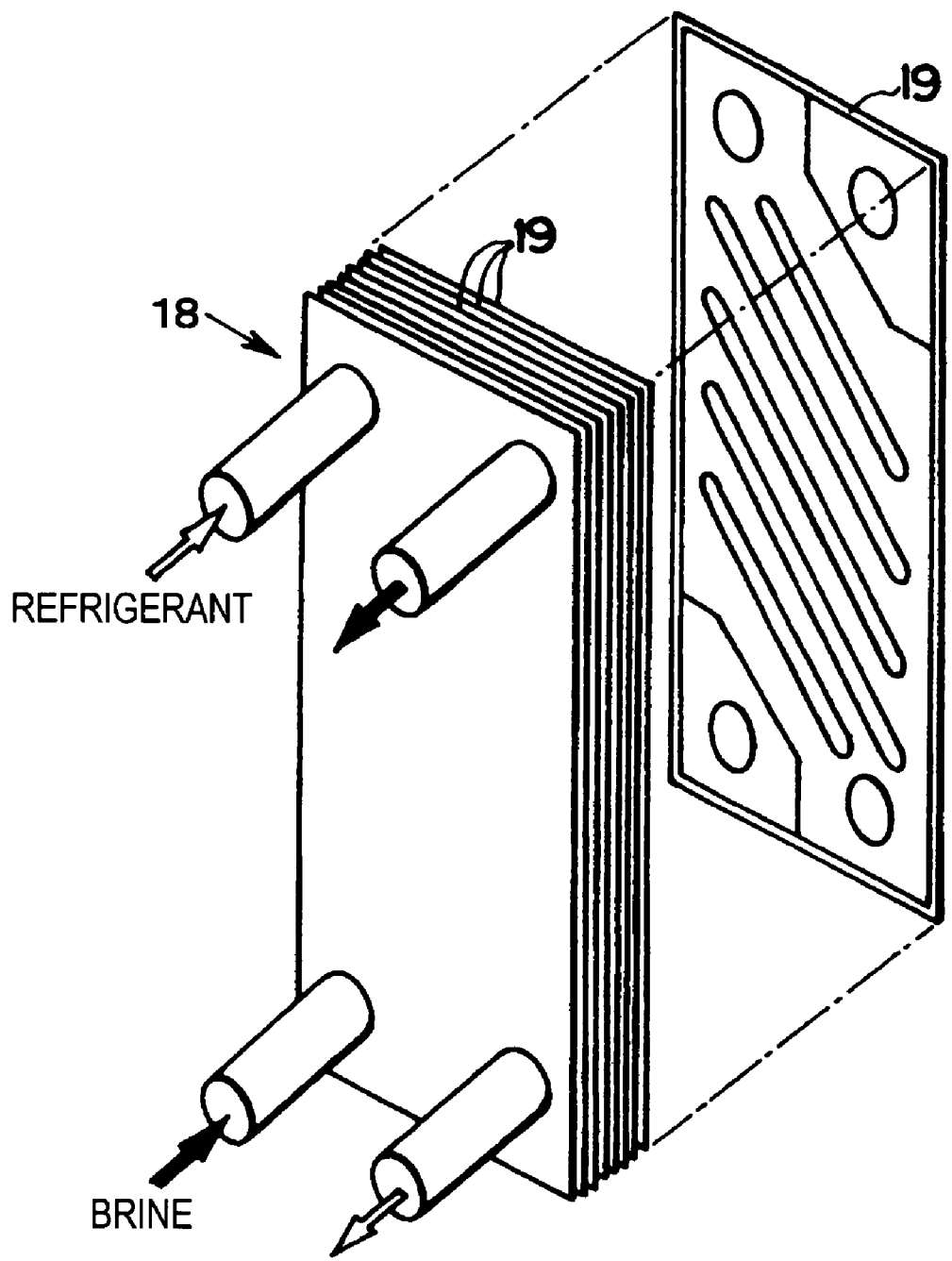
FIG. 3 is an exploded perspective view showing a construction of a heat exchanger shown in FIG. 1.
Figure 4:
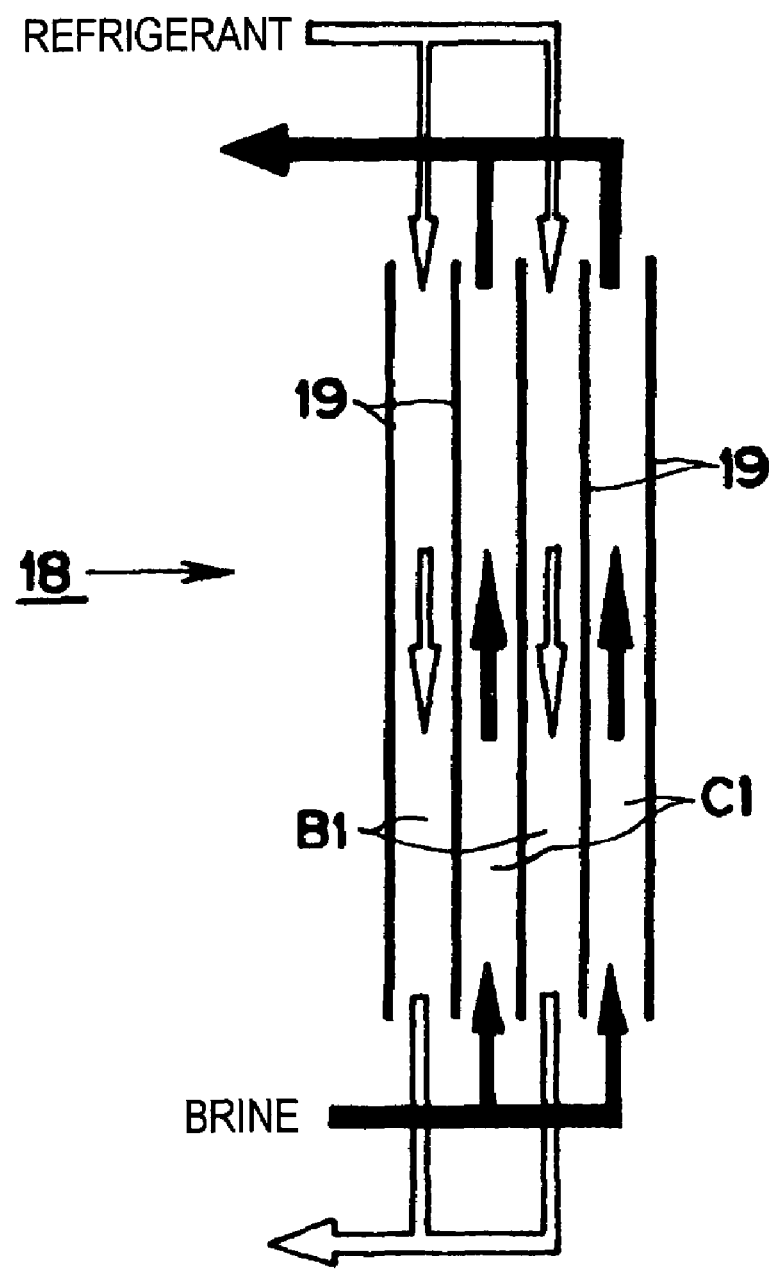
FIG. 4 is a conceptional diagram showing flowing directions of a brine and a refrigerant in the heat exchanger shown in FIG. 3.

Moreover, there is provided a heat exchanger 18 which constitutes a part of the circuit B1 and a part of the second circuit C1. Specifically, in the first circuit B1, the heat exchanger 18 is arranged between the pressure reducing unit 6 and the first heat storing device 8. FIGS. 3 and 4 illustrates a construction example of the heat exchanger 18. By arranging a plurality of heat transferring plates 19 in their thickness direction, the heat exchanger 18 constitutes a part of the first circuit B1 and a part of the second circuit C1 between the heat transferring plates 19 adjacent to each other.

In the heat exchanger 18, moreover, there are formed a first flow port 18A and a second flow port 18B for the first circuit B1, and those ports are communicated with each other. The second flow port 18B is communicated with the second flow port 6B of the pressure reducing unit 6, and the first flow port 18A is communicated with the first flow port 8B of the first heat storing device 8. In the heat exchanger 18, furthermore, there are formed a first flow port 18C and a second flow port 18D for the second circuit C1.

An air conditioning unit 20 is arranged over the second circuit C1 and the third circuit D1. This air conditioning unit 20 is equipped with a duct 23 having an air intake port 21 and an air discharging port 22. A fan 24, an indoor heat exchanger (or an evaporator) 25 and a heater 26 are disposed in the duct 23. The heater 26 has a heater core 35 and a damper 36. Opening degree of the damper 36 is adjustable. The indoor heat changer 25 is arranged between the fan 24 and the heater 26 in the duct 23.

The fan 24 is arranged on the portion closer to the air intake port 21 than the indoor heat exchanger 25 and the heater 26, whereas the heater 26 is arranged on the portion closer to the air discharging port 22 than the fan 24 and the indoor heat exchanger 25. The indoor heat exchanger 25 constitutes a part of the second circuit C1, and has an inlet 25A and an outlet 25B. The first flow port 18C of the heat exchanger 18 and the first flow port 8C of the first heat storing device 8 are connected in parallel with each other to the inlet 25A. On the other hand, the second flow port 18D of the heat exchanger 18 and the second flow port 8D of the first heat storing device 8 are connected in parallel with each other to the outlet 25B. The heater 26 constitutes a part of the third circuit D1, and has an inlet 26A and an outlet 26B. The inlet 26A of the heater 26 is communicated with the outlet 9D of the second heat storing device 9.

In the second circuit C1, moreover, there is arranged a three-way valve 27 for branching a flow passage toward the second flow port 18D of the heat exchanger 18, and the second flow port 8D of the first heat storing device 8. The three-way valve 27 selectively communicates or shuts off a route between the outlet 25B of the indoor heat exchanger 25 and the second flow port 8D of the first heat storing device 8 or the second flow port 18D of the heat exchanger 18. In the second circuit C1, moreover, a first pump 28 is arranged between the outlet 25B of the indoor heat exchanger 25 and the three-way valve 27. This first pump 28 has a suction port 28A and a discharging port 28B. The suction port 28A is connected to the outlet 25B, and the discharging port 28B is communicated with the three-way valve 27.

In the third circuit D1, a second pump 29 is arranged between the outlet 26B of the heater 26 and the inlet 9C of the second heat storing device 9. Both of the first pump 28 and the second pump 29 is a variable-capacitance pump. The second pump 29 has a suction port 29A and a discharging port 29B. The suction port 29A is communicated with the outlet 26B of the heater 26, and the discharging port 29B is communicated with the inlet 9C of the second heat storing device 9. Moreover, there are provided a temperature sensor 30 for detecting the internal temperature of the first heat storing device 8, a temperature sensor 31 for detecting the internal temperature of the second heat storing device 9, and a temperature sensor 32 arranged inside of the duct 23.

Figure 5:
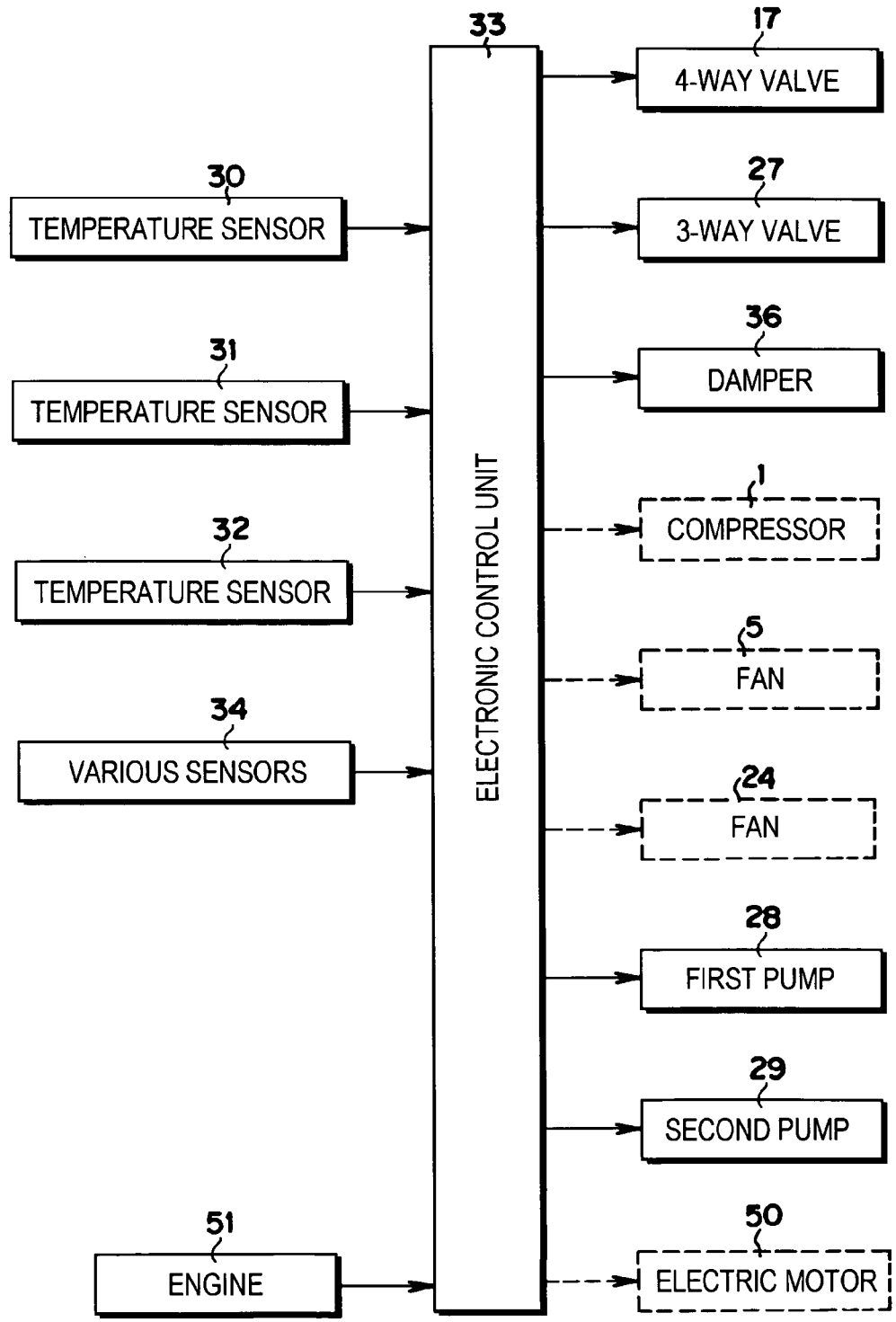
FIG. 5 is a block diagram showing a control line of the air conditioning system shown in FIG. 1.

A vehicle mounting the aforementioned air conditioning system thereon is exemplified by: a vehicle comprising an internal combustion engine as a prime mover; a vehicle (i.e., a hybrid vehicle) comprising a plurality of prime movers having different principles of power generation; and a vehicle (i.e., an electric vehicle) comprising an electric motor as a power source. For example, in the vehicle having the internal combustion engine, more specifically, having the engine as a power source, an engine power is transmitted to wheels through a transmission. The vehicle of this kind is controlled by a control line as illustrated in FIG. 5. In short, an electronic control unit 33 is provided as a controller for controlling the entire vehicle, which is constructed of a microcomputer composed mainly of a central processing unit (CPU or MPU), a memory unit (RAM and ROM) and an input/output interface. The information detected by the temperature sensors 30, 31 and 32 is inputted to the electronic control unit 33, while various kinds of sensors 34 detects information such as accelerator opening, engine speed, fuel injection, suction pipe negative pressure, outside air temperature, vehicle speed, operating condition of an air conditioning switch, amount of insolation, shift position, operating condition of an ignition key and so on. The various signals of the sensors 34 are inputted to the electronic control unit 33.

From the electronic control unit 33, on the other hand, there are outputted the signals for controlling the engine 51 and the three-way valve 27, the signals for controlling the opening degree of the damper 36, the signals for controlling the output of the first pump 28 and the second pump 29, and so on. If the compressor 1, the fans 5 and 24 are driven by the electric motor 50 instead of the engine 51, the signals for controlling the drive/stop of the electric motor 50, compressor 1, the fans 5 and 24 are outputted from the electronic control unit 33.

According to the aforementioned air conditioning system A1, it is possible to switch among three operation modes selectively: a rapid cooling mode, a normal cooling mode (including pre-cold storing mode) and a heating mode. Here will be described controls and actions of the air conditioning system A1 in each selected mode.

(Rapid Cooling Mode)

This rapid cooling mode is selected when the rapid cooling is required because the room temperature is extremely high, or the amount of heat stored in the first heat storing device 8 is smaller than a predetermined amount. In case the rapid cooling mode is selected, the four-way valve 17 is kept controlled to communicate the first flow port 8A of the first heat storing device 8 and the inlet 7A of the accumulator 7, and to discommunicate the second flow port 9B of the second heat storing device 9 and the first flow port 4A of the outdoor heat exchanger 4.

When the compressor 1 is driven, the refrigerant in the first circuit B1 is compressed and discharged form the discharge port 3 in the form of a high-temperature and high-pressure gas. The pressurizingly compressed refrigerant flows into the second heat storing device 9, and heat of the refrigerant is stored in the second heat storing device 9 thereby lowering the temperature of the refrigerant. Specifically, the heat of the refrigerant is transferred through the pipe 11 and the radiation fin 13 to the heat storage material 14, and stored therein. Moreover, the second pump 29 is driven to flow the brine through the third circuit D1 in the circulating direction G1.

On the other hand, the refrigerant discharged from the second flow port 9B of the second heat storing device 9 is conveyed to the outdoor heat exchanger 4. Since an air flow is generated by driving the fan 5, heat is radiated due to the forced-convection in the outdoor heat exchanger 4 thereby lowering the temperature of refrigerant and liquefying the refrigerant. The refrigerant thus cooled in the outdoor heat exchanger 4 is discharged from the second flow port 4B and conveyed to the pressure reducing unit 6. The refrigerant is adiabatically expanded by passing through the pressure reducing unit 6, and then conveyed to the heat exchanger 18.

Here will be described a heat exchanging action between the refrigerant and the brine in the heat exchanger 18. The refrigerant is expanded and the temperature thereof is lowered in the pressure reducing unit 6 in the first circuit B1. In the second circuit C1, since the flowages of the refrigerant and the brine are divided by the plate 19, heat of the brine is drawn by the refrigerant and is cooled sufficiently. Specifically, the heat exchanger 8 is constructed of a plurality of the plates 19 arranged in a chassis at a predetermined interval, and the spaces between the plates 19 are made to serve as flow passages. These flow passages are connected so as to flow the refrigerant through any one of the flow passages adjacent to each other across the plate 19, and to flow the brine through the other. Therefore, the flow passages are adjacent to each other in parallel. In the chassis, there are formed an flow inlet and an flow outlet communicating with the flow passage for the refrigerant, and an flow inlet and an flow outlet communicating with the flow passage for the brine.

The heat exchanger 18 makes the flowing directions of the refrigerant and the brine opposite to each other. That is, the circulating directions of the refrigerant in the first circuit B1 and the brine in the second circuit C1 are made opposite to each other. This construction aims at enhancing cooling effect of the brine, by setting the position in the flowing direction of the refrigerant where it can exert the most effective cooling action, at the position where the brine comes out of the heat exchanger 18, taking into account that the cooling action of the refrigerant deteriorates gradually and heat loss occurs in the heat exchanger 18, as the refrigerant moves the second flow inlet 18B to the first flow inlet 18A.

As described above, the refrigerant passed through the heat exchanger 18 is introduced into the compressor 1 through the first heat storing device 8. Thus, the refrigerant circulates in the first circuit B1. In case the rapid cooling mode has been selected, the refrigerant flows in the circulating direction F1 in the first circuit B1.

On the other hand, the three-way valve 27 is kept controlled to connect the outlet 28B of the first pump 28 and the second flow port 18D of the heat exchanger 18. By driving the first pump 28, the brine in the second circuit C1 is cooled by the refrigerant when passing through the heat exchanger 18. After this, the brine in the second circuit C1 is conveyed to the indoor heat exchanger 25 of the air conditioning unit 20. Thus, if the rapid cooling mode has been selected, the refrigerant flows in a circulating direction E1 in the second circuit C1.

In the air conditioning unit 20, on the other hand, the fan 24 is being driven, and the air taken from the air suction port 21 is fed to a vehicular room X1 from the air discharging port 22 through the duct 23. When the inside air of the duct 23 is passing through the indoor heat exchanger 25, heat of the air is transferred to the brine thereby cooling the air, and the temperature of the brine is raised. Thus, the temperature in the vehicular room X1 is lowered. The brine flows through the third circuit D1 also in the rapid cooling mode; however, since the damper 36 of the heater 26 is closed, the heat exchange is not carried out between the brine in the third circuit D1 and the air flowing in the duct 23.

(Normal Cooling Mode)

This normal cooling mode is selected to execute cooling in case heat has been stored in the first heat storing device 8 more than the predetermined amount. In case the normal cooling mode is selected, the first circuit B1 and the third circuit D1 fall into same conditions as that in the rapid cooling mode. In the second circuit C1, on the other hand, the three-way valve 27 is controlled to communicate the outlet 28B of the first pump 28 and the second flow port 8D of the first heat storing device 8, and to shut off a route between the outlet 28B of the first pump 28 and the second flow port 18D of the heat exchanger 18. As a result, the brine discharged from the first pump 28 is conveyed to the first heat storing device 8 through the three-way valve 27. In the first heat storing device 8, heat exchange is carried out between the low-temperatured refrigerant in the first circuit B1 and the brine flowing in the second circuit C1.

Figure 2:
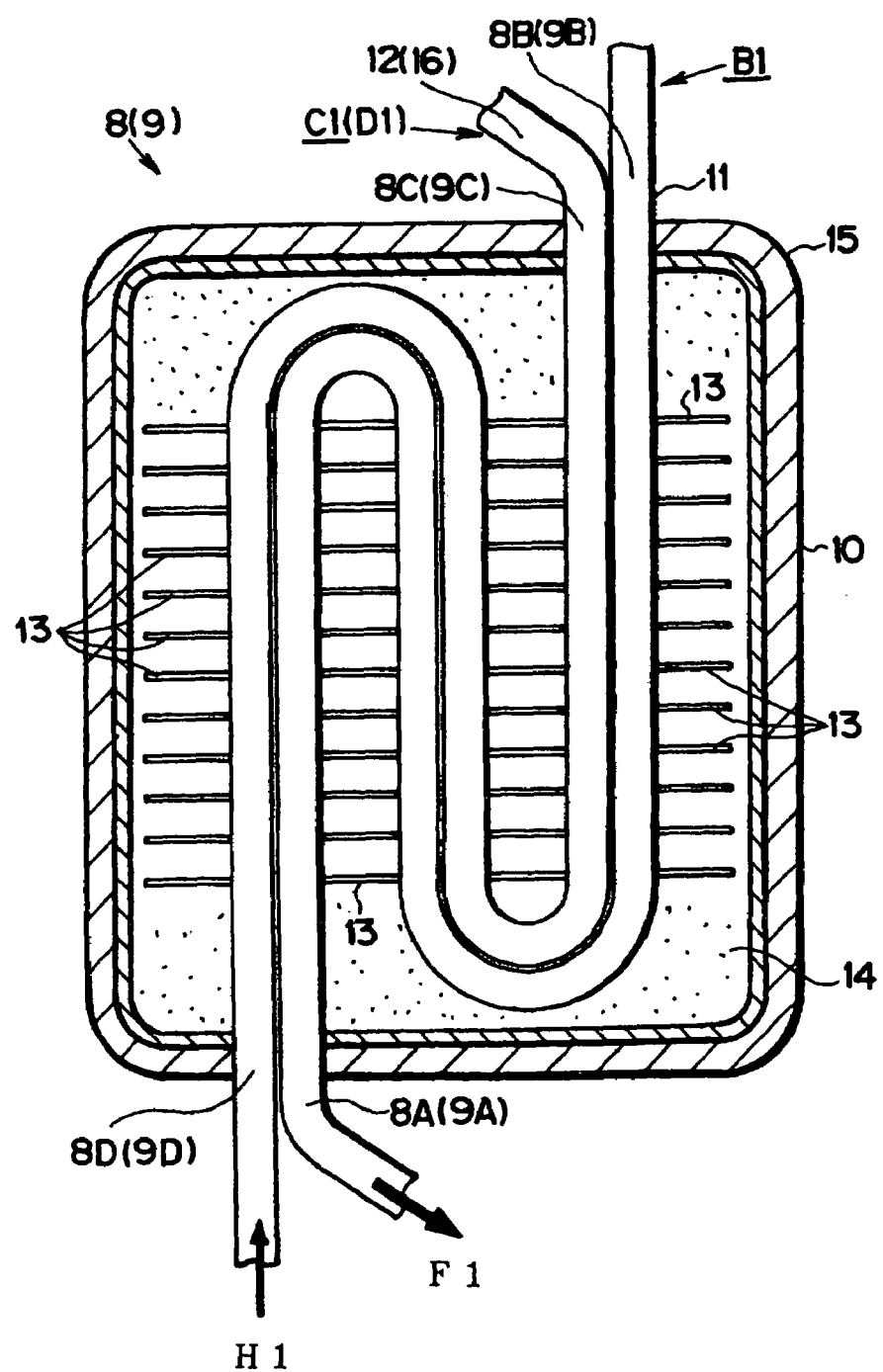
FIG. 2 is a sectional view showing a construction of a heat storing device shown in FIG. 1.

As shown in FIG. 2, the first heat storing device 8 is provided with the heat storage material 14. The heat of the brine is drawn by the heat storage material 14 and the brine is thereby cooled sufficiently. As shown in FIG. 2, moreover, the refrigerant and the brine flow in the opposite directions to each other. That is, the circulating direction F1 of the refrigerant in the first circuit B1 and a circulating direction H1 of the brine in the second circuit C1 are made opposite to each other. This construction aims at enhancing cooling effect of the brine, by setting the position in the flowing direction of the refrigerant where it can exert the most effective cooling action, at the position where the brine comes out of the heat exchanger 18, taking into account that the cooling action of the refrigerant deteriorates gradually and heat loss occurs in the first heat storing device 8, as the refrigerant moves from the second flow outlet 8B to the first flow outlet 8A.

In this embodiment, even in the normal cooling mode, the refrigerant in the first circuit B1 is introduced into the first heat storing device 8 through the heat exchanger 18. However, in the normal cooling mode, the refrigerant in the first circuit B1 can be introduced into the first heat storing device 8 without passing through the heat exchanger 18 (i.e., bypassing the heat exchanger 18). With this construction, the transporting route for the refrigerant is shortened so that the necessary energy to drive the compressor 1 for generating the transportation force for the refrigerant can be saved, and fuel consumption of the engine is improved.

Thus, the brine cooled by the first heat storing device 8 is discharged from the first flow port 8C of the first heat storing device 8, and then conveyed to the air conditioning unit 20. Rest of actions and controls not described above are same as those in the rapid cooling mode. Thus, in case the normal cooling mode is selected, the brine flows through the second circuit C1 in the circulating direction H1. Descriptions of the pre-cold storage mode will be omitted.

(Heating Mode)

In case the heating mode is selected, the four-way valve is controlled to communicate the first flow port 8A of the first heat storing device 8 and the second flow port 9B of the second heat storing device 9, and to communicate the inlet 7A of the accumulator 7 and the second flow port 4A of the outdoor heat exchanger 4. The three-way valve 27 is controlled to communicate the discharging port 28B of the first pump 28 and the second flow port 8D of the first heat storing device 8, and to discommunicate the discharging port 28B of the first pump 28 and the second flow port 18D of the heat exchanger 18. The first pump 28 and the second pump 29 are driven, and the damper 36 of the heater 26 is opened.

In case the heating mode is selected, the refrigerant in the first circuit B1 is compressed by the compressor 1 and made into a high-temperature and high-pressure gas. The refrigerant is then conveyed to the second heat storing device 9. When the refrigerant is conveyed to the second heat storing device 9, heat of the refrigerant is transferred to the brine in the third circuit D1. Specifically, the heat of the refrigerant is transferred to the brine through the pipe 11, the radiation fin 13, the heat storage material 14 and the pipe 16. Moreover, the refrigerant is sucked into the compressor 1 through the heat exchanger 18, the pressure reducing unit 6, the outdoor heat exchanger 4 and the accumulator 7. In case the heating mode is selected, as has been described above, the refrigerant flows through the first circuit B1 in a circulating direction J1.

In the second circuit C1, on the other hand, the brine flows from the discharging port 28B of the first pump 28 toward the first heat storing device 8 by driving the first pump 28. Then, in the first heat storing device 8, the heat of the refrigerant is transferred to the brine in the second circuit C1 and the brine is thereby heated. Specifically, the heat of the refrigerant is transferred to the brine through the pipes 11 and 12, the radiation fin 13 and the heat storage material 14. This high-temperatured brine is discharged from the first flow port 8C of the first heat storing device 8 and transported to the indoor heat exchanger 25 of the air conditioning unit 20. When the air flowing in the duct 23 is passing through the indoor heat exchanger 25, the heat of the brine is transferred to the inside air of the duct 23, and the heated air is fed from the air discharging port 22 to the vehicular room X1. Thus, the vehicular room X1 is heated. The heat discharged from the outlet port 25B of the indoor heat exchanger 25 is then sucked into the suction port 28A of the first pump 28.

In case the heating mode is selected, the second pump 29 is driven in the third circuit D1, and the brine flows through the third circuit D1 in the circulating direction G1. Therefore, the brine, of which the temperature is raised in the second heat storing device 9, is conveyed to the heater 26. In the heater 26, heat of the brine is transferred to the air in the duct 23, and the air in the duct 23 is further heated. The heat discharged from the outlet 26B of the heater 26 is sucked into the suction port 29A of the second pump 29.

Here will be described a comprehensive control example including selection among the aforementioned three operation modes, with reference to the flowcharts shown in FIGS. 6 and 7. Each portion designated by a circled number in the flowchart shown in FIG. 6 continues to a control routine designated by corresponding circled number in FIG. 7. To start, referring to the flowchart shown in FIG. 6, it is judged (at Step S601) whether or not a demand to activate the air conditioning system A1 is made. If the air conditioning switch has been turned on, for example, the answer of Step S601 is YES, and then it is judged (at Step S602) whether or not the rapid cooling demand is made.

Figure 8:
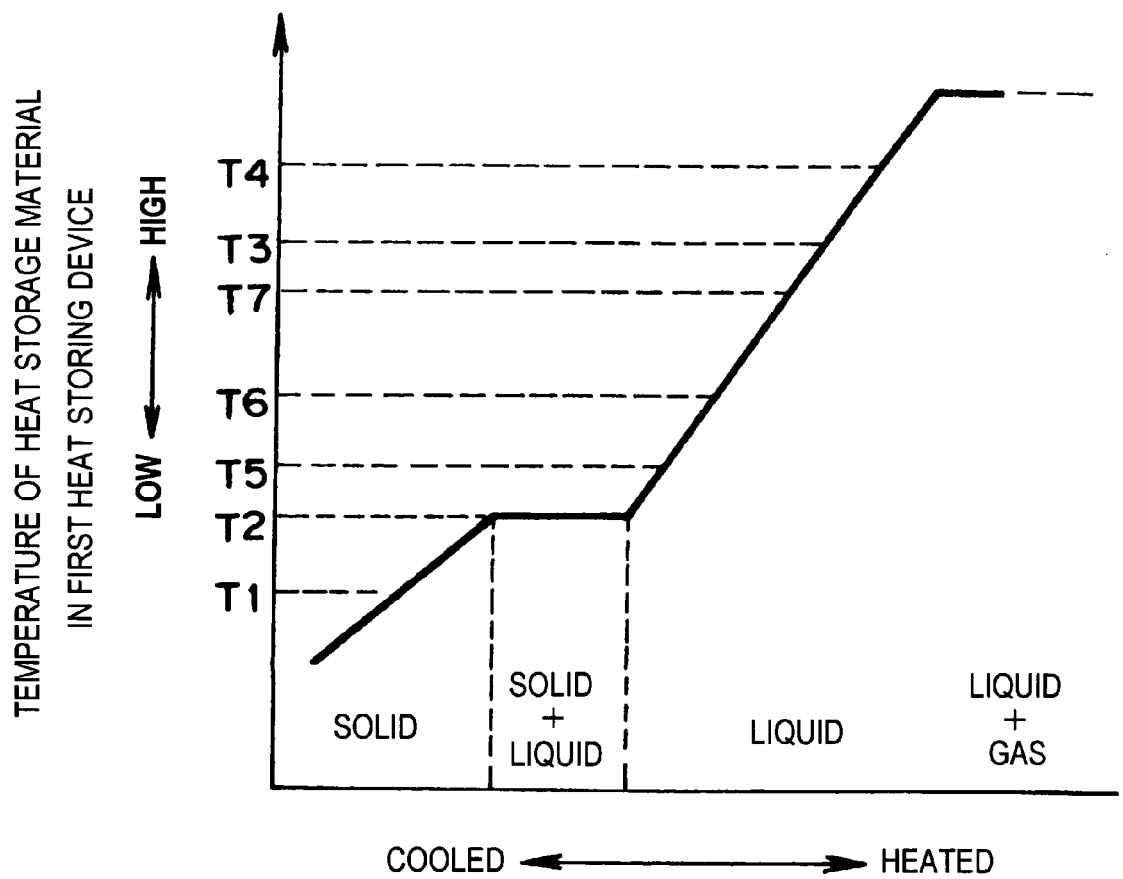
FIG. 8 is a diagram showing one example of a map used in the control example shown in FIGS. 6 and 7.
Figure 9:
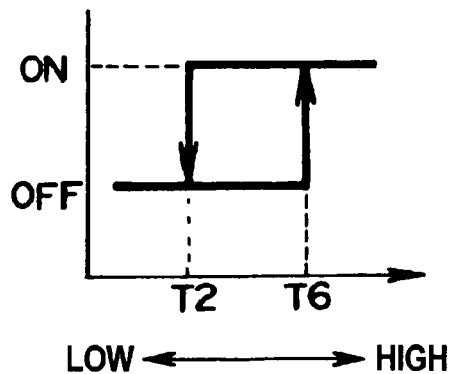
FIG. 9 is a diagram showing a threshold value of temperature judgment used in the control example shown in FIGS. 6 and 7.

The judgment at Step S602 is made on the basis of, for example, the map shown in FIG. 8 and the diagram shown in FIG. 9. The map of FIG. 8 shows the correspondence between the temperature of the heat storage material 14 of the first heat storing device 8 and the cooling/heating condition of the heat storage material 14. The map of FIG. 8 illustrates that the heat storage material 14 is in a solid state when the temperature thereof is at or lower than T2, that the heat storage material 14 is in a mixed state of solid and liquid when the temperature thereof is at T2, and that the heat storage material 14 is in a liquid state or in a mixed state of liquid and gas when temperature thereof is over T2.

As shown in the diagram of FIG. 9, in case the temperature of the heat storage material 14 of the first heat storing device 8 is rising, the rapid cooling demand is OFF when temperature of the heat storage material 14 is at or lower than T6. In case the temperature of the heat storage material 14 of the first heat storing device 8 reaches T6 or higher, the rapid cooling demand is ON. On the other hand, in case the temperature of the heat storage material 14 of the first heat storing device 8 is lowering, the rapid cooling demand is ON when the temperature of the heat storage material 14 exceeds T2, and the rapid cooling demand is OFF when the temperature of the heat storage material 14 is at or lower than T2. Thus, the hysteresis is set on the threshold values T2 and T6 for the temperature. It is also possible to judge whether or not the rapid cooling demand is made by measuring the ambient temperature around the vehicle or in the vehicular room, and based on whether or not the measured temperature is higher than the predetermined value.

If the answer of Step S602 is YES, the rapid cooling mode is selected. Then, the four-way valve 17 and the three-way valve 27 are controlled into the state corresponding to the rapid cooling mode, and also, the first pump 28 and the second pump 29 are driven (at Step S604), and the routine advances to Step S605.

Figure 10:
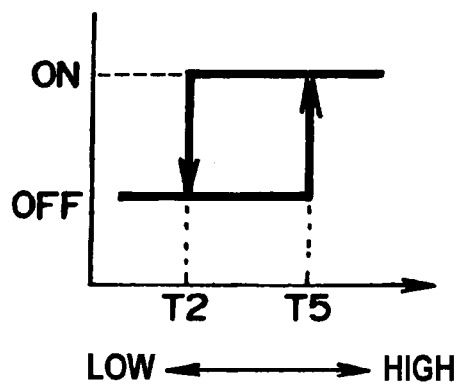
FIG. 10 is a diagram showing another threshold value of temperature judgment used in the control example shown in FIGS. 6 and 7.

At Step S605, it is judged whether or not the cold storage deficiency judgment of the first heat storing device 8 is ON, on the basis of FIGS. 8 and 10. "Cold storage deficiency" means that "the temperature of the heat storage material 14 has not been lowered to the predetermined value or lower". As shown in the diagram of FIG. 10, for example, in case the temperature of the heat storage material 14 is rising, the cold storage deficiency judgment is OFF when the temperature of the heat storage material 14 is at or lower than T5, and the cold storage deficiency judgment is ON when the temperature of the heat storage material 14 exceeds T5. On the other hand, in case the temperature of the heat storage material 14 is lowering, the cold storage deficiency judgment is ON when the temperature of the heat storage material 14 exceeds T2, and the cold storage deficiency judgment is OFF when the temperature of the heat storage material 14 is at or lower than T2.

If the answer of Step S605 is YES, the amount of heat stored in the heat storage material 14 is not sufficient. The air conditioning priority demand is ON at Step S606, and the routine advances to Step S608. On the other hand, if the answer of Step S605 is NO, the amount of heat stored in the heat storage material 14 is sufficient. The air conditioning priority demand is OFF at Step S607, and the routine advances to Step S608. "Air conditioning priority demand" means that "it is permitted to drive the compressor 1 regardless of the engine load condition, if the amount of heat stored in the first heat storing device 8 in case of executing the cooling operation by using the first heat storing device 8 as a heat source, or the amount of heat stored in the second heat storing device 9 in case of carrying out the heating operation by using the second heat storing device 9 as a heat source, is insufficient with respect to each air conditioning demand, and the air conditioning cannot be executed sufficiently".

Figure 11:
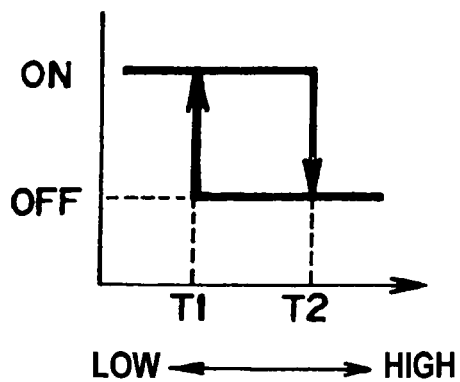
FIG. 11 is a diagram showing still another threshold value of temperature judgment used in the control example shown in FIGS. 6 and 7.

At Step S608, it is judged whether or not the cold storage of the first heat storing device 8 has been completed, on the basis of the map of FIG. 8 and the diagram of FIG. 11. "Cold storage completion" means that "the temperature of the heat storage material 14 is lowered at or lower than the predetermined temperature". For example, in case the temperature of the heat storage material 14 is rising, the cold storage completion judgment is ON when the temperature of the heat storage material 14 is at or lower than T2, and the cold storage completion judgment is OFF when the temperature of the heat storage material 14 exceeds T2. On the other hand, in case the temperature of the heat storage material 14 is lowering, the cold storage completion judgment is OFF when the temperature of the heat storage material 14 exceeds T1, and the cold storage completion judgment is ON when the temperature of the heat storage material 14 is at or lower than T1. Thus, the hysteresis is set to the threshold values T1 and T2 for the temperature.

Figure 12:
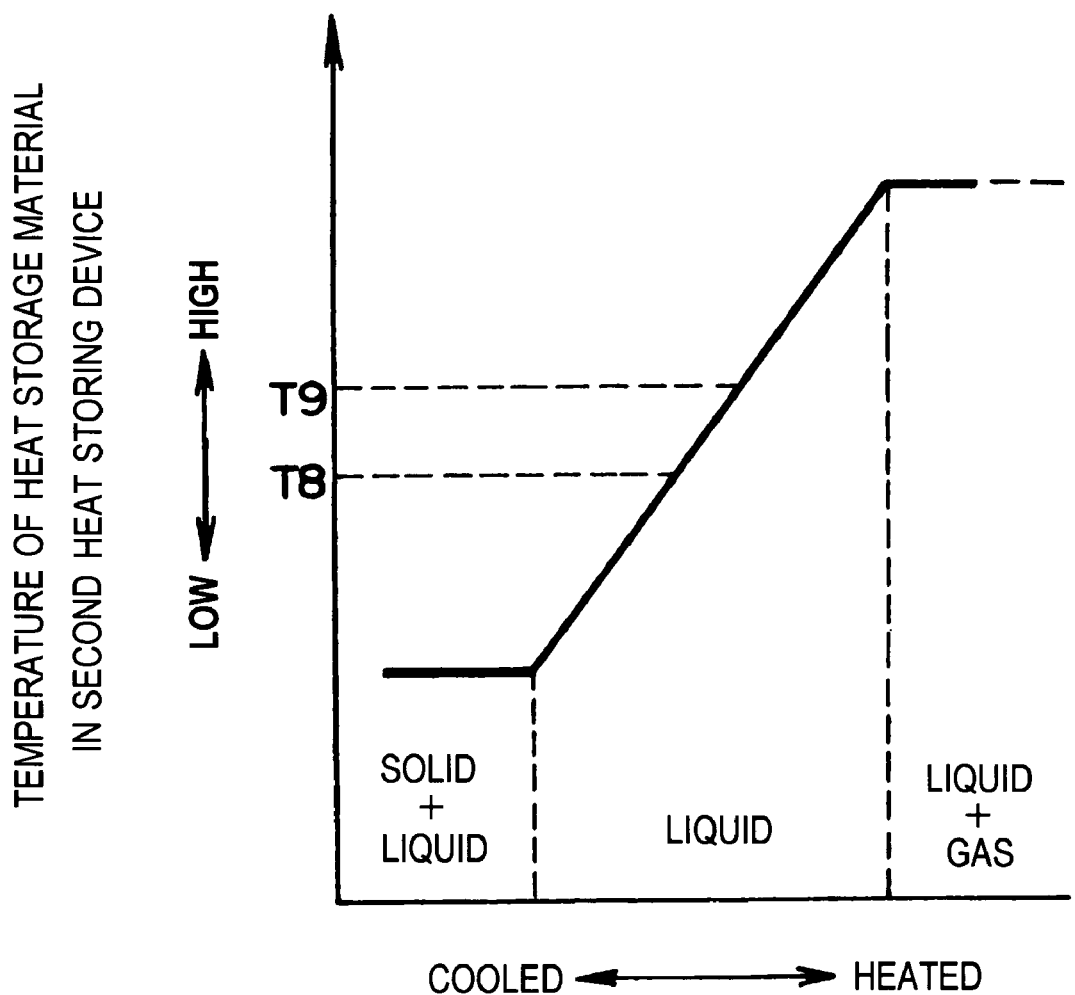
FIG. 12 is a diagram showing another example of a map used in the control example shown in FIGS. 6 and 7.
Figure 13:
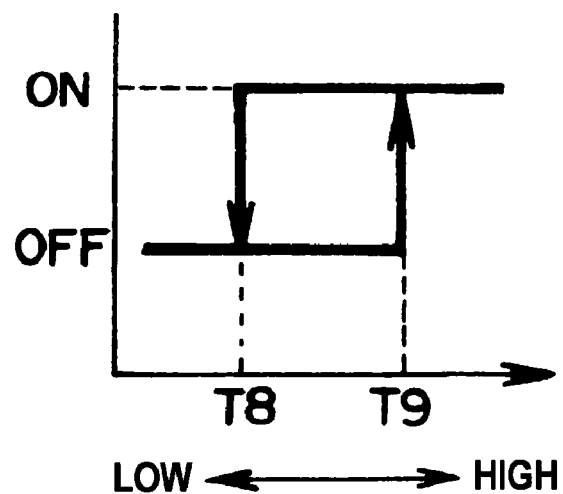
FIG. 13 is a diagram showing another threshold value of temperature used in the control example shown in FIGS. 6 and 7.

If the answer of Step S608 is YES, it is judged (at Step S609) whether or not the heat storage completion judgment of the second heat storing device 9 is ON, on the basis of the map of FIG. 12 and the diagram of FIG. 13. "Heat storage completion" means that "the temperature of the heat storage material 14 is raised higher than the predetermined temperature". The map of FIG. 12 shows the corresponding relation between the temperature of the heat storage material 14 in case of utilizing sensible heat of a liquid phase, and the cooling/heating condition. Specifically, the target temperature of the cold storage is set between T8 and T9, i.e., between the melting point and the boiling point of the heat storage material 14.

In case the temperature of the heat storage material 14 is rising, the heat storage completion judgment is OFF when the temperature of the heat storage material 14 is at or lower than T9, and the heat storage completion judgment is ON when the temperature of the heat storage material 14 exceeds T9. On the other hand, in case the temperature of the heat storage material 14 is lowering, the heat storage completion judgment is ON when the temperature of the heat storage material 14 exceeds T8, and the heat storage completion judgment is OFF when the temperature of the heat storage material 14 is at or lower than T8. Thus, the hysteresis is set to the threshold values T8 and T9 for the temperature.

If the answer of Step 609 is YES, the operation permission of the compressor 1 is OFF (at Step S610), and the routine advances to Step S618. On the other hand, if the answer of Step S608 is NO, the operation permission of the compressor 1 is ON (at Step S611), and the routine advances to Step S618.

On the other hand, if the answer of Step S609 is NO, the operation permission of the compressor 1 is ON at Step S612, and it is judged at Step S613 whether or not the heat storage material 14 of the second heat storing device 9 is being thawed (i.e., under the thawing operation). If the answer of Step S613 is NO, the thawing operation is started at Step S616, and a timer 1 is started at Step S617. As illustrated in FIG. 1, in case the thawing operation is started, the heat storage material 14 is thawed by temporarily switching the circulating direction of the refrigerant in the first circuit B1 to the same circulating direction as that in the heating mode (i.e., the circulating direction J1 in FIG. 1), under such a condition that the cooling load is low, and that heat storage material 14 of the first heat storing device 8 is entirely solidified and the cold storage has been completed, when the refrigerant is flowing through the first circuit B1 in the circulating direction F1 to execute cooling operation.

If the answer of Step S613 is YES, it is judged (at Step S614) whether or not the timer 1 has timed out. For example, the necessary time until the heat storage material 14 is liquefied is determined from the temperature of the heat storage material 14 in the second heat storing device 9, and the timer 1 is set on the basis of the determination result.

If the answer of Step S614 is YES, the thawing operation is OFF at Step S615. Also, the circulating direction of the refrigerant in the first circuit B1 is returned to the circulating direction corresponding to the cooling mode (i.e., the circulating direction F1 in FIG. 1), and the routine advances to Step S618. On the other hand, if the answer of Step S614 is NO, the routine advances to Step S618 as it is.

If the answer of Step S618 is YES, the routine advances to Step S619. The first pump 28 is halted and the routine returns to Step S601. On the contrary, if the answer of Step S618 is NO, the first pump 28 is driven after the output thereof is set as follows. First of all, the first pump 28 is subjected to on/off control, and the heating capacity is controlled by adjusting the opening degree of the damper 36 of the heater core 35. The output of the first pump 28 is so controlled that the air temperature TE at the downstream side of the air discharging port 22 in the air flowing direction reaches a target temperature TEO. During the cooling operation, therefore, when the substantial air temperature in the vehicular room X1 is higher than the target temperature, a control is made to increase the flow rate of the first pump 28. On the other hand, when the substantial air temperature in the vehicular room X1 is at or lower than the target temperature, a control is made to reduce the flow rate of the first pump 28. During the heating operation, on the contrary, when the substantial air temperature in the vehicular room X1 is higher than the target temperature, a control is made to reduce the flow rate of the first pump 28. On the other hand, when the substantial air temperature in the vehicular room X1 is at or lower than the target temperature, a control is made to increase the flow rate of the first pump 28.

Thus, when executing the control of flow rate of the first pump 28, a P1 control may be made to feedback the substantial air temperature in the vehicular room X1 to the target temperature. The following is one example of formulas for calculating the flow rate of each pump used for the P1 control.

(During the Cooling Operation)

$$En = TE-TEO$$

$$P1out = P1out(n-1) + Kp((E(n)-E(n-1)) + (T/Ti*E(n))$$

(During the Heating Operation)

$$En = TE-TEO$$

$$P1out = P1out(n-1) - Kp((E(n)-E(n-1)) + (T/Ti*E(n))$$

In the above formulas: P1out is the output of the first pump 28; TE is the substantial air temperature; TEO is the target temperature; E is the deviation between the air temperature and the target temperature; KP is the proportional constant; Ti is the integral constant; and T is the sampling time.

Figure 6:
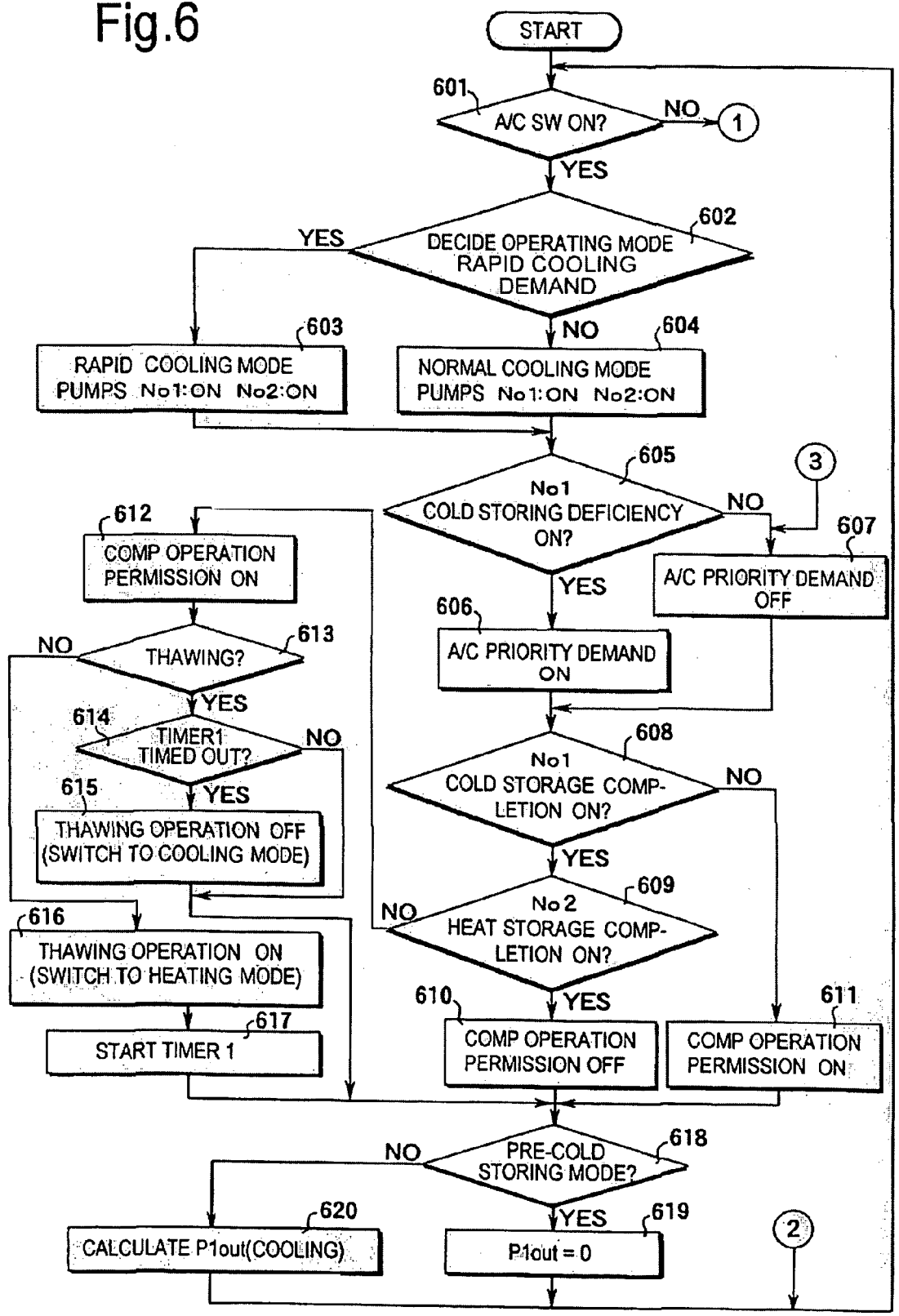
FIG. 6 is a diagram showing a main part of a control flowchart to be applied to the air conditioning system shown in FIG. 1.
Figure 7:
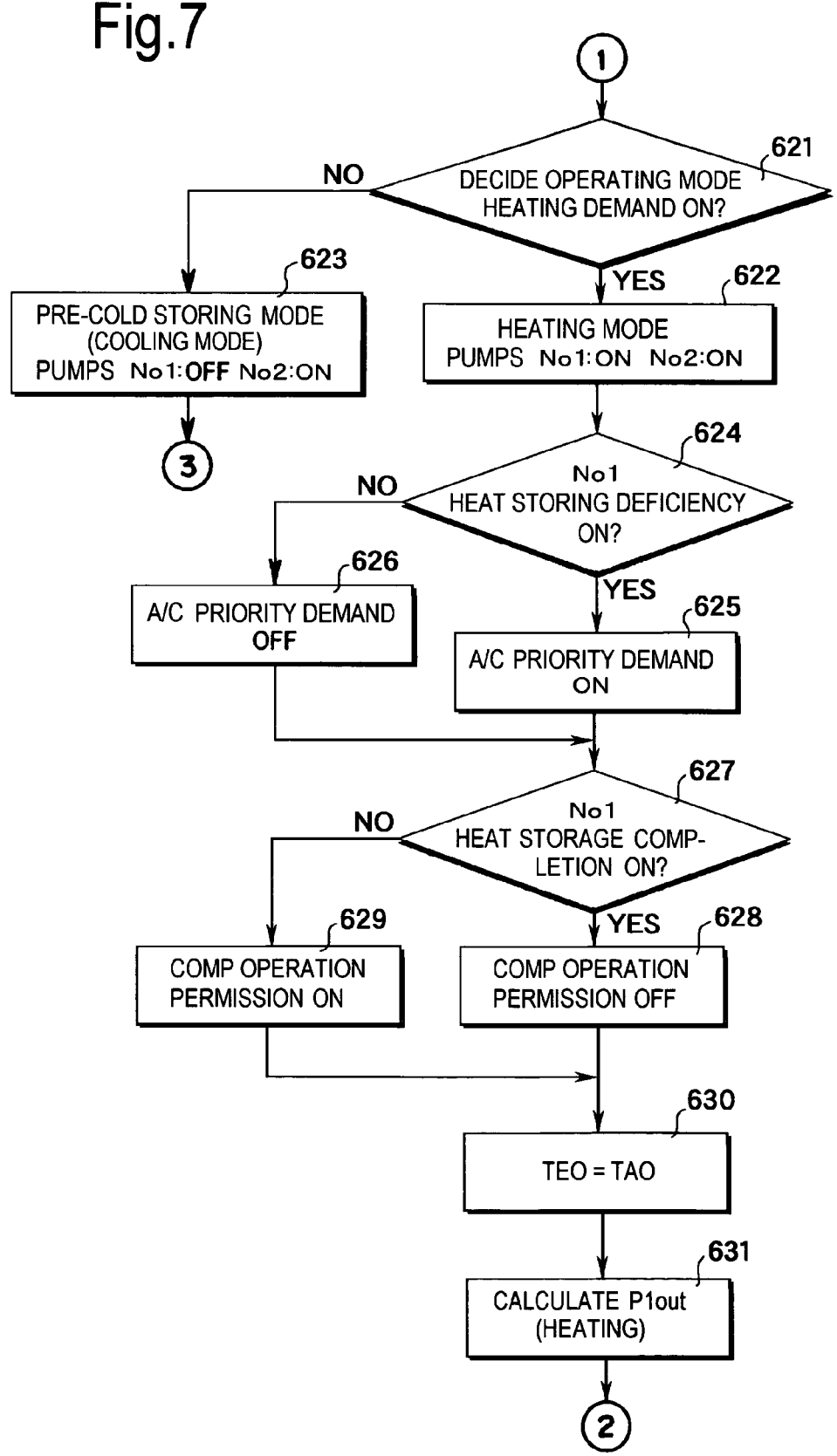
FIG. 7 is a diagram showing a part continuing to the flowchart shown in FIG. 6.

On the other hand, if the air conditioning switch has been turned off when making the judgment at Step S601 in FIG. 6, the answer of Step S601 is NO and the routine advances to FIG. 7. Then, it is decided (at Step S621) whether or not the heating demand is ON. The judgment at Step S621 is made on the basis of the diagram of FIG. 14. For example, in case the target temperature of the air blowing from the air discharging port 22 of the air conditioning unit 20 (i.e., a necessary blow temperature TAO) is rising, the heating demand is OFF when the necessary blow temperature is at or lower than T45. On the other hand, the heating demand is ON when the necessary blow temperature exceeds T45. On the contrary, in case the necessary blow temperature is lowering, the heating demand is ON when the necessary blow temperature exceeds T45. On the other hand, the heating demand is OFF when the necessary blow temperature is at or lower than T35. Thus, the hysteresis is set to the threshold values T35 and T45 for the temperature.

Figure 15:
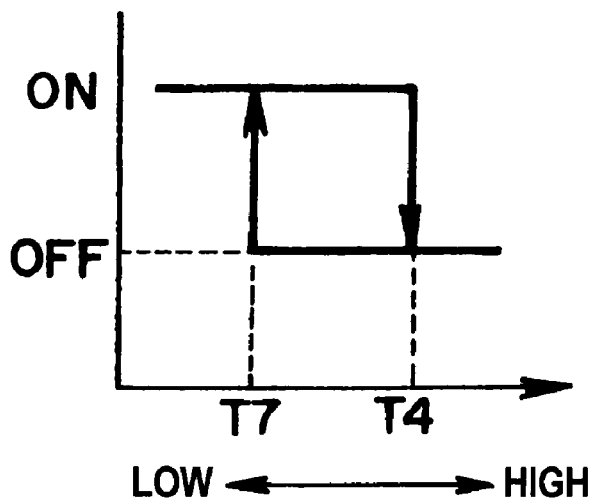
FIG. 15 is a diagram showing another threshold value of temperature used in the control example shown in FIGS. 6 and 7.

If the answer of Step S621 is YES, the heating mode is selected, and the first pump 28 and the second pump 29 are driven (at Step S622). Then, it is judged (at Step S624) whether or not the heat storage deficiency judgment of the first heat storing device 8 is ON, on the basis of the map of FIG. 8 and the diagram of FIG. 10. "Heat storage deficiency" means that "the temperature of the heat storage material 14 has not been raised higher than the predetermined temperature". As shown in FIG. 15, for example, in case the temperature of the heat storage material 14 is rising, the heat storage deficiency judgment is ON when the temperature of the heat storage material 14 is at or lower than T4, whereas the heat storage deficiency judgment is OFF when the temperature of the heat storage material 14 exceeds T4. On the other hand, in case the temperature of the heat storage material 14 is lowering, the heat storage deficiency judgment is OFF when the temperature of the heat storage material 14 exceeds T7, and the heat storage deficiency judgment is ON when the temperature of the heat storage material 14 is at or lower than T7. Thus, the hysteresis is set to the threshold values T4 and T7 for the temperature.

If the answer of Step 624 is YES, the air conditioning priority demand is ON (at Step S625), and the routine advances to Step S627. On the contrary, if the answer of Step 624 is NO, the air conditioning priority demand is OFF (at Step S626), and the routine advances to Step S627. At Step S627, it is judged whether or not the heat storage completion judgment of the first heat storing device is ON, on the basis of the map of FIG. 8 and the diagram of FIG. 16.

Figure 16:
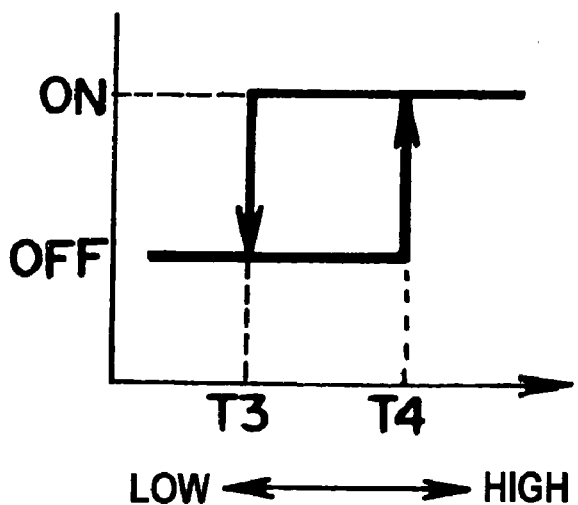
FIG. 16 is a diagram showing still another threshold value of temperature used in the control example shown in FIGS. 6 and 7.

As shown in FIG. 16, for example, in case the temperature of the heat storage material 14 is rising, the heat storage completion judgment is OFF when the temperature of the heat storage material 14 is at or lower than T4, whereas the heat storage completion judgment is ON when the temperature of the heat storage material 14 exceeds T4. On the other hand, in case the temperature of the heat storage material 14 is lowering, the heat storage completion judgment is ON when the temperature of the heat storage material 14 exceeds T3, whereas the heat storage completion judgment is OFF when the temperature of the heat storage material 14 is at or lower than T3.

If the answer of Step S627 is YES, the operation permission of the compressor is OFF (at Step S628), and the routine advances to Step S630. On the contrary, if the answer of Step S627 is NO, the operation permission of the compressor is ON (at Step S629), and the routine advances to Step S630.

The following formula is set at Step S630.

$$TEO = TAO$$

TAO is the target (required) temperature of the air being discharged from the air discharging port 22. Subsequently to Step S630, the outputs of the first pump 28 and the second pump 29 are calculated (at Step S631), and the routine returns to Step S601 of FIG. 6. The negative answer at Step S621 means that neither cooling nor heating is required under that condition.

In this case, the pre-cold storing mode is selected (at Step S623), and the routine advances to Step S607 of FIG. 6. If the pre-cold storing mode is selected, a control is made to store heat in the heat storing device or to radiate heat from the heat storing device by driving the compressor 1 by a part of the torque of the idling engine 51, under such a condition that fuel consumption of the engine 51 is nearly unaffected; for example, when the vehicle is running by the inertia force and a control is being made to suspend the fuel feeding, the kinetic energy generated by the inertia running of the vehicle is transmitted to the engine 51 thereby idling the engine 51.

By executing such a control, heat of the first heat storing device 8 is radiated without deteriorating fuel consumption of the engine 51, and the heat is stored in the second heat storing device 9. Therefore, it is possible to prepare for next requirement not only of the air conditioning function, but also of the heating operation.

Figure 14:
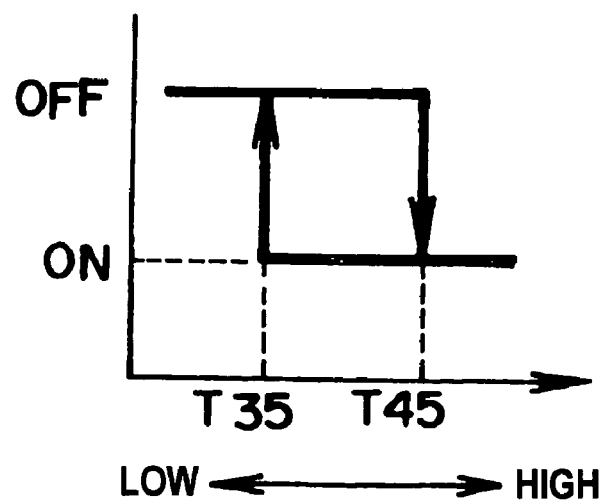
FIG. 14 is a diagram showing still another threshold value of temperature used in the control example shown in FIGS. 6 and 7.

In each Step, when the ignition key is turned on through the accessory position, i.e., when the system is activated, various judgments are made regardless of the temperature of the respective diagrams. In the diagram of FIG. 9, for example, when the system is activated, a rapid cooling demand judgment is ON. On the other hand, in the diagram of FIG. 10, when the system is activated, the cold deficiency judgment of the first heat storing device 8 is ON. In the diagram of FIG. 11, when the system is activated, the cold storage deficiency judgment of the first heat storing device 8 is OFF. In the diagram of FIG. 13, when the system is activated, the heat storage completion judgment of the second heat storing device 9 is OFF. In the diagram of FIG. 14, when the system is activated, the heating demand judgment is ON. In the diagram of FIG. 15, when the system is activated, the heat storage deficiency judgment of the first heat storing device 8 is ON. In the diagram of FIG. 16, when the system is activated, the heat storage completion judgment of the first heat storing device 8 is OFF. At Step S601 in FIG. 6, it is also possible to judge, on the basis of the outside air temperature, whether or not the activation demand of the air conditioning system A1 is made.

Thus, in the air conditioning system A1 illustrated in FIG. 1, heat exchange is carried out between the refrigerant flowing through the first circuit B1 and the brine flowing through the second circuit C1, so as to heat or cool the air. In this embodiment, moreover, there are some differences between the heat exchanger 18 and the first heat storing device 8 in the heat exchange function, e.g., the heat transfer coefficient, a heat flux, a heat transmission coefficient, a heat resistance or the like. Specifically, the heat exchange function between the refrigerant and the brine of the heat exchanger 18 is higher than that of the first heat storing device 8. This is because the heat storing material 14 is not accommodated in the heat exchanger 18, and the heat capacity of the first heat storing device 8 is therefore larger than that of the heat exchanger 18 in which the heat storing material 14 is accommodated.

For this reason, in the air conditioning system A1 as shown in FIG. 1, the heat exchange function (or the heat exchange characteristics) between the refrigerant of the first circuit B1 and the brine of the second circuit C1 can be changed without changing the refrigerant transport function of the compressor 1, by selecting either the first heat storing device 8 or the heat exchanger 18. Therefore, the necessary air conditioning function can be obtained regardless of the operating condition of the compressor 1, thereby controlling the room temperature arbitrarily.

Moreover, it is less necessary to control the driving condition of the compressor 1 in accordance with the necessary blow temperature. In other words, the impact on the engine load caused by the air conditioning demand is suppressed. If the compressor 1 is driven by the engine 51, accordingly, fuel consumption of the engine 51 can be improved. On the other hand, if the engine 51 is driven by an electric generator, and the electric motor 50 is provided with electric energy to drive the compressor 1, consumption of electric energy is suppressed in the electric motor 50 so that fuel consumption of the engine 51 can be improved. That is, the engine load can be equalized regardless of the change in the necessary blow temperature. Moreover, it is possible to suppress consumption of a part of power for driving the compressor 1 when the engine torque is low, thereby suppressing a degrading of drivability.

In the first heat storing device 8 or the heat exchanger 18, moreover, in case the heat storage characteristics of the first heat storing device 8, such as a temperature, heat amount or the like, has been ready for responding to the necessary blow temperature, the heat exchange is carried out between the brine and the refrigerant through the first heat storing device 8. Therefore, the mismatch between the necessary blow temperature and the heat storage characteristics is surely avoided so that the air conditioning function of the air conditioning system A1 can be further improved.

Furthermore, heat of the refrigerant flowing through the first circuit B1 can be stored in the second heat storing device 9, and the heat can be transferred to the air passing through the duct 23. Therefore, it is possible to enhance usability of the surplus heat energy which is generated during the compression by the compressor 1 and not transferred to the heat exchanger 18 and the first heat storing device 8, so that the air conditioning function of the air conditioning system A1 can be further improved.

Conventionally, heat of the condenser 4 is radiated to ambient air. According to this embodiment, the heat of the condenser 4 is stored in the second heat storing device 9, and the heat energy can be used for airmix during the cooling operation, as a heat source during the heating operation, and as a heat source for warming up the engine 51 or heating oil and so on. The "airmix" means that the air cooled by the indoor heat exchanger 25 is heated by heat of the heater 26 in order to keep the temperature of the vehicular room X1 in the target temperature. In case of using the heat as the heat source for warming up the engine 51 or heating the oil and so on, specific embodiments of the case are exemplified as follows:

① A preset condition is satisfied (e.g., the vehicle is stopped, the accelerator opening is zero, and a brake pedal is ON) and "idling stop control" to stop the engine 51 is made.

② A hybrid vehicle having the engine 51 and the electric motor as prime movers is run by a torque of the electric motor with the engine 51 kept stopped.

Moreover, heat of the high-pressure and high-temperature refrigerant gas compressed by the compressor 1 is drawn by the second heat storing device 9, and the refrigerant then is fed to the condenser, thereby reducing heat amount of the refrigerant to be radiated by the condenser. This makes it possible to lower the operation rate of the fan 5, thereby reducing necessary electricity to operate the fan 5. In addition, it is also possible to improve fuel consumption of the engine 51 for driving the electric generator to generate the electricity.

According to the air conditioning system shown in FIG. 1, still moreover, in case the rapid cooling mode or the cooling mode is selected, the flowing direction of the refrigerant in the first circuit B1 and the flowing direction of the brine in the second circuit C1 are opposed to each other. Specifically, if the rapid cooling mode is selected, the moving directions of the refrigerant and the brine are opposed to each other in the heat exchanger 18, and if the cooling mode is selected, the moving directions of the refrigerant and the brine are opposed to each other in the first heat storing device 8. For this reason, the temperature difference between the refrigerant and the brine can be kept as large as possible in the whole area in the flowing directions of the refrigerant and the brine. This enhances the heat transfer efficiency in the heat exchanger 18 and the first heat storing device 8.

The radiation fin 13 is arranged in the first heat storing device 8 and the second heat storing device 9. Therefore, the heat transferring condition can be homogenized in the entire heat storage material 14. This makes it possible to decongest the stress on the heat storage material 14, thereby improving durability of the heat storing devices. Moreover, providing the radiation fin 13 increases the heat transferring area between the refrigerant and the brine, thereby enhancing the heat transfer efficiency.

In case the rapid cooling mode or the cooling mode is selected, moreover, it is possible to store heat of the refrigerant in the second heat storing device 9 before the refrigerant is conveyed to the outdoor heat exchanger 4. Therefore, the operation rate of the fan 5 for cooling the refrigerant can be lowered. In the example of FIG. 1, heat of the second heat storing device 9 is transferred to the air conditioning unit 20.

However, if the heat of the second heat storing device 9 is used for warming-up of the engine 51 at its starting time, the emission abatement may be improved. This example is applicable to a vehicle having only an engine as a prime mover, a hybrid vehicle having an engine and an electric motor as a prime mover, and an economy-running vehicle which is capable of controlling start and halt of the engine on the basis of predetermined conditions other than the operating state of the ignition key, and so on.

According to the embodiment of FIG. 1, moreover, it is possible to store cold in the first heat storing device 8, and to store heat in the second heat storing device 9. Under a condition such that both cooling and heating is possible to be used (i.e., in spring or autumn), therefore, the heat preliminarily stored in the second heat storing device 9 can be utilized when the heating operation is required, and the heat preliminarily stored in the first heat storing device 8 can be utilized when the cooling operation is required. This makes it possible to prevent heat loss.

Still moreover, if heat is stored preliminarily in the second heat storing device 9 and the first heat storing device 8 by driving the compressor 1, the air conditioning system A1 can be driven. In this case, it is possible to use the stored heat by operating only the first pump 28 and the second pump 29, without driving the compressor 1. Therefore, fuel consumption and drivability of the engine 51 can be improved.

Since the stored heat in the second heat storing device 9 can be used for airmix at the cooling time, dehumidifying, heating and so on, it is preferable that the second heat storing device 9 is under the maximum heat storage condition. In the aforementioned flowchart of FIG. 6, for example, if the routine advances to Step S612 through Step S608 and Step S609, it is preferable to store heat in the second heat storing device 9 which can store heat more. However, if the cold storage has been completed in the first heat storing device 8, the heat in the first heat storing device 8 cannot be transferred to the refrigerant in the first circuit B1 transported by the compressor 1.

In this case, at Step S616, the heat storage material 14 of the first heat storing device 8 is temporarily put under the thawing operation so as to transfer the heat of the first heat storing device 8 to the refrigerant in the first circuit B1. Moreover, it is preferable to determine the preset time of the timer 1 at Step S617 so as to achieve such a heat capacity as expected.

The expected heat capacity is determined from a road gradient information, an infrastructure information (a traffic information, weather information and so on), a vehicle speed, an engine speed, an outside temperature, an amount of heat necessary for air conditioning of vehicular room. Also, the expected heat capacity can be set on the basis of the amount of heat stored in the second heat storing device 9.

Here will be described the corresponding relation between the construction of embodiments and the present invention. The refrigerant corresponds to the first heating medium of the invention; the brine corresponds to the second heating medium according to the invention; the electronic control unit 33 corresponds to the control unit of the invention; "the case in which the temperature of the heat storage material 14 exceeds a predetermined temperature" corresponds to "the case in which the predetermined heat is stored in the first heat storing device"; the circulating direction F1 of the refrigerant in the first circuit B1 corresponds to "the circulating direction of the first heating medium in the first circuit" and the circulating directions H1 and E1 of the brine in the second circuit C1 corresponds to "the circulating direction of the second heating medium in the second circuit".

The characteristic constructions described in the embodiments are exemplified as follows; specifically, a control unit of an air conditioning system, which executes heat exchange between a heating medium and a first heat transfer object by moving the heating medium by a transfer unit or a pressure unit, is characterized by comprising a temperature control demand judging means for judging a temperature control demand of an object to be air-conditioned, and an selection means for selecting, when the heat exchange is executed between the heating medium and the first heat transfer object, a heat exchanger to be used from a plurality of heat exchangers having different heat exchange functions respectively and arranged at different positions in the moving direction of the heating medium.

Moreover, the selection means further comprises a function to select any one of the plurality of heat exchangers, in case of changing the temperature of the first heat transfer object for more than a predetermined value, in order to improve the hear exchange function between the heating medium and the first heat transfer object. Still moreover, the selection means comprises a function to select any one of the plurality of heat exchangers which has had a predetermined function such that the temperature of the first heat transfer object can be set to a predetermined temperature.

Furthermore, there is arranged a heat exchanger for executing heat exchange between the heating medium and a second heat transfer object, if a mechanical energy is applied on the heating medium by the transfer unit or the pressure unit thereby changing the temperature of the heating medium. Moreover, the moving direction of the heating medium and the moving direction of the first heating object are opposite to each other. Moreover, the heat transferred from the heating medium to the first heat transfer object and the heat transferred from the heating medium to the second heat transfer object are transferred to same temperature control object portion. Here, Step S601, Step S602 and Step S621 shown in FIGS. 6 and 7 correspond to the temperature control demand judging means, and Step S603, Step S604, Step S622 and Step S623 correspond to the selection means.

The temperature control demand judging means as described in the characterizing part can be read as a temperature control demand judger or a controller for temperature control demand judgment, and the selection means can be read as a selector or a controller for selection. In this case, the electronic control unit 33 shown in FIG. 5 corresponds to the temperature control demand judger, the controller for temperature control demand judgment, the selector or the controller for selection. Moreover, the temperature control demand judging means as described in the characterizing part can be read as a temperature control demand deciding step, the selection means can be read as a selecting step, and the control unit for the air conditioning system can be read as a control step for the air conditioning system.

As has been described above, according to the air conditioning system of the invention, the first heating medium is heated or cooled by using the power unit such as the engine and the motor, but the first heating medium does not execute heat exchange with the air directly. This enables the first heating medium to be heated or cooled independently from an air conditioning demand, so that the direct impact of the air conditioning demand on the load of the power unit can be mitigated. As a result, fuel consumption of a vehicle mounting the engine can be improved.

Moreover, a plurality of heat exchangers having different heat exchange characteristics respectively is arranged in a circuit which the first heating medium flows through. The second heating medium flows into any one of those heat exchangers selectively, and executes heat exchange with the first heating medium. With this construction, the ability for cooling or heating the second heating medium can be switched thereby executing the air conditioning on demand.

If the flowing directions of the first heating medium and the second heating medium in the heat exchanger are made opposite to each other, it is possible to make the temperature difference between the heating mediums greater at the outlet side of the second heating medium, thereby heating or cooling the second heating medium efficiently. That is, the heat transfer efficiency between each of the heating mediums can be improved.

According to the invention, instead of the heat exchanger, a heat exchanger having a heat storing function or a heat storing device may be arranged in the first circuit. In other words, the aforementioned third heat exchanger may be replaced by the one having such a heat storing function. With this construction, since the heat exchange efficiency of the first heat exchanger is high, the rapid cooling demand is fully satisfied. Moreover, since the heat for cooling can be stored in the third heat exchanger, the energy efficiency can be improved.

According to the invention, moreover, there may be arranged a second heat storing device. The second heat storing device is heated by receiving heat from the first heating medium and stores the heat therein. For example, the first heating medium may be a liquid which is adiabatically expanded after pressurizingly compressed, and the temperature of which is lowered. In this case, since the amount of heat of the first heating medium is increased due to the pressurizing compression, the heat is not discharged to outside but recovered by the second heat storing device. As a result of this, the energy efficiency can be improved and fuel consumption of the vehicle is thereby improved.

The heat storing device according to the invention is constructed such that a number of fins are integrated with a pipe which the heating medium flows through, and the pipe and fins are embedded in the heat storage material. Therefore, it is possible to increase the heat exchange efficiency between the heat storage material and each of the heating mediums, and to prevent or ease concentration of thermal stress in the heat storing device.

According to the invention, heat of the second heat storing device can be transferred to air by using the third circuit so that the heat efficiency during heating operation can be improved, and the so-called airmix can be carried out easily and efficiently.

The second heat storing device is aligned right behind the compressor which pressurizes and compresses the first heating medium. Therefore, the amount of heat of the first heating medium to be recovered by the second heat storing device is increased. As a result, the load on the heat radiation device is decreased so that the heat radiating device can be downsized, and energy consumption can be reduced in case of executing a compulsory cooling.

A prime mover for running may be utilized as the prime mover for driving the compressor. In that case, if the prime mover is compulsorily driven by the running inertia force, it is possible to select the pre-heat storing mode in which heat storage is executed by driving the compressor by the running inertia force. As a result, regenerative energy amount is further increased so that fuel consumption of the vehicle can be improved.

The heat stored in the second heat storing device of the invention can be used for various applications. In order to regulate the air temperature, for example, it is possible to use the heat for airmix to provide heat to the air once cooled in the second heat exchanger. On the other hand, the heat may be used for heating or keeping heat of the oil or the internal combustion engine. Thus, the recovered heat can be used efficiently so that the fuel consumption of the vehicle is improved, and the emission can be reduced.

INDUSTRIAL APPLICABILITY

This invention can be utilized in the industrial field where air conditioning of a room, a working space and so on is executed, and a system therefor is manufactured. Moreover, this invention can be utilized in the field where a stationary air conditioning system or a mobile air conditioning system mounted on a vehicle is used or manufactured.

The invention claimed is:

1. An air conditioning system for cooling or heating an air, and for feeding the heated or cooled air to predetermined portions, comprising:
   a first circulating circuit circulating a first heating medium;
   a second circulating circuit circulating a second heating medium;
   a first heat exchanger executing heat exchange between the first and second heating media;
   a second heat exchanger for executing heat exchange between the second heating medium and the heated or cooled air;
   a compressor pressurizing the first heating medium;
   an expander distributing the pressurized first heating medium, connected with the first heat exchanger;
   a first heat storing device having a storing material which is heated or cooled by the first heating medium, executing heat exchange among the first heating medium, the second heating medium, and the heat storing material;
   a three-way valve arranged in the second circulating circuit and connected with the first heat exchanger, the first heat storing device, and the second heat exchanger;
   a controller connected with the three-way valve and executing a switching operation of the three-way valve on the basis of an air conditioning demand, the controller comprising a microcomputer having a central processing unit, a memory unit, an input, and an output; and
   a pump pressurizing and flowing the second heating medium;
   wherein the controller comprises a means for controlling an output of the pump on the basis of a deviation between the air temperature and a target temperature at a predetermined position in the outlet side of the second heat exchanger;
   wherein the second circulating circuit comprises a first sub-circuit flowing the second heating medium through the first heat exchanger, a second sub-circuit flowing the second heating medium through the first heat storing device, and the three-way valve communicating the second heat exchanger selectively to the first sub-circuit and the second sub-circuit;
   wherein the first heat exchanger is arranged on an upstream side of the first heat storing device in a flowing direction of the low-temperatured first heating medium;
   wherein the three-way valve executes a switching operation to flow the second heating medium into the first heat exchanger through the first sub-circuit in case the rapid cooling is demanded, and executes a switching operation to flow the second heating medium into the first heat storing device through the second sub-circuit in case the normal cooling is demanded;

wherein a second heat storing device having a heat storage material which receives heat from the first heating medium and stores the heat therein is arranged in the first circulating circuit; and wherein the controller operates the first circulating circuit in accordance with a temperature of at least one of the first and second heat storing devices and operates the second circulating circuit in accordance with the air temperature.

2. The air conditioning system according to claim 1, wherein:
the controller controls a switching operation of the three-way valve so as to flow the second heating medium through a selected one of the first heat exchanger and the first heat storing device, when the air conditioning demand increases.

3. The air conditioning system according to claim 1, wherein:
the first heat exchanger comprises a first flow passage flowing the first heating medium, and a second flow passage formed adjacent to and in parallel with the first flow passage and flowing the second heating medium; and
a flowing direction of the first heating medium in the first flow passage and a flowing direction of the second heating medium in the second flow passage are opposite to each other.

4. The air conditioning system according to claim 1, further comprising:
a heat source mechanism, including said compressor, heating and cooling the first heating medium; wherein
the controller operates the heat source mechanism, in case the temperature of the heat storage material in at least any one of the heat storing devices is at a predetermined value or lower, and air conditioning is demanded.

5. The air conditioning system according to claim 1, wherein:
at least one of the first heat storing device and the second heat storing device comprises a pipe penetrating the heat storage material flowing the first heating medium or the second heating medium therethrough, and a plurality of fins embedded in the heat storage material and integrated with the pipe.

6. The air conditioning system according to claim 1, wherein:
the second heat storing device is arranged on an upstream side of the first heat storing device in a flowing direction of the first heating medium.

7. The air conditioning system according to claim 1, further comprising:
a third heat exchanger executing heat exchange selectively with the air; and
a third circuit circulating a third heating medium between the second heat storing device and the third heat exchanger, and providing heat to the third heating medium in the second heat storing device.

8. The air conditioning system according to claim 1, further comprising:
a determining device determining permission and non-permission of operation of the compressor on the basis of the temperature of the heat storage material in either the first heat storing device or the second heat storing device;
wherein a hysteresis is set to the permissible temperature and non-permissible temperature of operation of the compressor.

9. The air conditioning system according to claim 1, further comprising:
a thawing device heating the first heat storing device temporarily;
wherein the first heat storing device stores energy for cooling, and the second heat storing device stores heat for heating.

10. The air conditioning system according to claim 9, wherein:
the air conditioning system is mounted in a vehicle; and
wherein the thawing device comprises a means for setting the amount of heat for heating the first heat storing device on the basis of at least one of a road information on which the vehicle is running, weather around the vehicle, a vehicle speed, an engine speed, outside temperature, and an amount of heat necessary to air condition the room.

11. The air conditioning system according to claim 10, further comprising:
a prime mover outputting a power, which runs the vehicle and, that drives the compressor; wherein
the controller selects a pre-heat storing mode, in which heat is stored in the first heat storing device or radiated by driving the compressor by a running inertia force, when the prime mover is driven compulsorily by the running inertia force.

12. The air conditioning system according to claim 1, further comprising:
a selector valve switching a flowing direction of the first heating medium, into a direction from the compressor through a heat radiator and the expander to the first heat storing device, and into a direction from a heater through the first heat storing device and the expander to the heat radiator.

13. The air conditioning system according to claim 12, wherein:
the second heat storing device, which receives heat from the first heating medium and stores the heat therein, is arranged between a discharging port of the compressor and the selector valve.

14. The air conditioning system according to claim 13, further comprising:
a third heat exchanger executing heat exchange selectively with the air; and
a third circulating circuit circulating a third heating medium between the second heat storing device and the third heat exchanger, and providing heat to the third heating medium in the second heat storing device.

15. The air conditioning system according to claim 1, further comprising:
an air mix executing device providing heat of the second heat storing device to the air cooled by the second heat exchanger, thereby heating the air.

16. An air conditioning system for cooling or heating an air, and for feeding the heated or cooled air to predetermined portions, comprising:
a first circulating circuit circulating a first heating medium;
a second circulating circuit circulating a second heating medium;
a first heat exchanger executing heat exchange between the first and second heating media;
a second heat exchanger for executing heat exchange between the second heating medium and the heated or cooled air;
a compressor pressurizing the first heating medium;
an expander distributing the pressurized first heating medium, connected with the first heat exchanger;

a first heat storing device having a heat storing material which is heated or cooled by the first heating medium, executing heat exchange among the first heating medium, the second heating medium, and the heat storing material;

a three-way valve arranged in the second circulating circuit and connected with the first heat exchanger, the first heat storing device, and the second heat exchanger;

a controller connected with the three-way valve and executing a switching operation of the three-way valve on the basis of an air conditioning demand, the controller comprising a microcomputer having a central processing unit, a memory unit, an input, and an output;

a second heat storing device having a heat storage material which receives heat from the first heating medium and stores the heat therein is arranged in the first circulating circuit; and at least one of an internal combustion engine and a drive unit having oil;

wherein the controller provides heat stored in the second heat storing device to any one of the internal combustion engine or the drive unit, thereby executing either warming up of the internal combustion engine or heating of the oil;

wherein the second circulating circuit comprises a first sub-circuit flowing the second heating medium through the first heat exchanger, a second sub-circuit flowing the second heating medium through the first heat storing device, and the three-way valve communicating the second heat exchanger selectively to the first sub-circuit and the second sub-circuit;

wherein the first heat exchanger is arranged on an upstream side of the first heat storing device in a flowing direction of the low-temperatured first heating medium; and wherein the three-way valve executes a switching operation to flow the second heating medium into the first heat exchanger through the first sub-circuit in case the rapid cooling is demanded, and executes a switching operation to flow the second heating medium into the first heat storing device through the second sub-circuit in case the normal cooling is demanded.

17. The air conditioning system according to claim 16, wherein:

the controller operates a first circulating circuit in accordance with a temperature of at least one of the heat storing devices and operates the second circulating circuit in accordance with the air temperature.

18. The air conditioning system according to claim 16, further comprising:

a means for warming up the internal combustion engine by the heat of the second heat storing device, while the internal combustion engine is halted.

\* \* \* \* \*